United States Patent
Vasudevan et al.

(10) Patent No.: US 11,430,467 B1
(45) Date of Patent: Aug. 30, 2022

(54) INTERACTION EMOTION DETERMINATION

(71) Applicant: Amazon Technologies, Inc., Seattle, WA (US)

(72) Inventors: Naveenan Vasudevan, Seattle, WA (US); Girish Vuggina, Bothell, WA (US); Njenga Kariuki, Seattle, WA (US); Siddhi Pathak, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 17/027,509

(22) Filed: Sep. 21, 2020

(51) Int. Cl.
*G10L 25/30* (2013.01)
*G10L 25/63* (2013.01)
*G10L 15/22* (2006.01)

(52) U.S. Cl.
CPC ............. *G10L 25/63* (2013.01); *G10L 25/30* (2013.01); *G10L 2015/228* (2013.01)

(58) Field of Classification Search
CPC .... G10L 25/63; G10L 2510/228; G10L 25/30
USPC ........................................................ 704/270
See application file for complete search history.

(56) References Cited

U.S. PATENT DOCUMENTS

| | | | |
|---|---|---|---|
| 7,050,084 B1* | 5/2006 | Lang | G03B 13/02 348/14.05 |
| 2015/0310864 A1* | 10/2015 | Li | G10L 15/1822 704/235 |
| 2020/0053464 A1* | 2/2020 | Peters | H04R 5/04 |
| 2020/0234715 A1* | 7/2020 | Kim | G06F 3/167 |

OTHER PUBLICATIONS

A. Houjeij, L. Hamieh, N. Mehdi and H. Hajj, "A novel approach for emotion classification based on fusion of text and speech," 2012 19th International Conference on Telecommunications (ICT), 2012, pp. 1-6, doi: 10.1109/ICTEL.2012.6221211. (Year: 2012).*
Aguilar, G., et al., "Multimodal and Multi-view Models for Emotion Recognition," in ACL, 2019, https://www.aclweb.org/anthology/P19-1095.pdf, 12 pages.
Ba, J. L., et al., "Layer Normalization," in NIPS Deep Learning Symposium, 2016, https://arxiv.org/pdf/1607.06450.pdf, 14 pages.
Bergstra, J. and Bengio, Y., "Random Search for Hyper-Parameter Optimization," JMLR, 2012, http://jmlr.csail.mit.edu/papers/volume 13/bergstra12a/bergstra12a.pdf, 25 pages.
Busso, C., et al., "IEMOCAP: Interactive Emotional Dyadic Motion Capture Database," Language Resources and Evaluation, Kluwer Academic Publishers, 2008, https://sail.usc.edu/publications/files/BussoLRE2008.pdf, 30 pages.

(Continued)

*Primary Examiner* — Bharatkumar S Shah
(74) *Attorney, Agent, or Firm* — Athorus, PLLC

(57) ABSTRACT

Disclosed are systems and methods for determining sentiment data representative of an emotional state of a user during an interaction with one or more non-users. The disclosed implementations may further determine, for frequent interactions between the user and a non-user, the identity of the non-user and provide information to the user relating to the sentiment of the user when interacting with the non-user.

20 Claims, 22 Drawing Sheets

(56) References Cited

OTHER PUBLICATIONS

Devlin, J., et al., "BERT: Pre-training of Deep Bidirectional Transformers for Language Understanding," in HLT, 2019, https://www.aclweb.org/anthology/N19-1423.pdf, 16 pages.
Dhingra, B., et al., "Tweet2Vec: Character-Based Distributed Representations for Social Media," in ACL, 2016, https://www.cs.cmu.edu/~wcohen/postscript/acl-2016-bd.pdf, 6 pages.
Graves, A., et al., "Connectionist Temporal Classification: Labelling Unsegmented Sequence Data with Recurrent Neural Networks," in ICML, 2006, https://www.cs.toronto.edu/~graves/icml_2006.pdf, 8 pages.
Greedy Decoder, https://www.tensorflow.org/api_docs/python/tf/nn/ctc_greedy_decoder, (downloaded Jun. 14, 2017, by web.archive.org).
He, K., et al., "Deep Residual Learning for Image Recognition," in CVPR, 2016, http://openaccess.thecvf.com/content_cvpr_2016/papers/He_Deep_Residual_Learning_CVPR_2016_paper.pdf, 9 pages.
Hochreiter, S. and Schmidhuber, J., "Long Short-Term Memory," Neural Computation, vol. 9, No. 8, pp. 1735-1780, 1997, https://www.researchgate.net/profile/Sepp_Hochreiter/publication/13853244_Long_Short-term_Memory/links/5700e75608aea6b7746a0624/Long-Short-term-Memory.pdf?origin=publication_detail,33 pages.
Lakomkin, E., et al., "Incorporating End-To-End Speech Recognition Models For Sentiment Analysis," in ICRA, 2019, https://arxiv.org/pdf/1902.11245.pdf, 7 pages.
Lin, L. I-K, "A Concordance Correlation Coefficient to Evaluate Reproducibility," Biometrics, 1989, https://pdfs.semanticscholar.org/1527/ba83e2656b0427052b5209c0470affa318ef.pdf?_ga=2.221014936.1226002713.1582334499-1985355348.1527123823, 14 pages.
Liu, Z., et al., "Entity Recognition from Clinical Texts via Recurrent Neural Network," BMC Medical Informatics and Decision Making, 2017, https://bmcmedinformdecismak.biomedcentral.com/track/pdf/10.1186/s12911-017-0468-7, 9 pages.
Lotfian, R. and Busso, C., "Building Naturalistic Emotionally Balanced Speech Corpus by Retrieving Emotional Speech from Existing Podcast Recordings," IEEE Transactions on Affective Computing, 2017, 13 pages.
Lu, Z. et al., Speech Sentiment Analysis via Pre-Trained Features from End-to-End ASR Models, Computation and Language (cs.CL); Machine Learning (cs.LG); Audio and Speech Processing (eess.AS), 5 pages, https://arxiv.org/pdf/1911.09762.pdf.
Metze, F., et al., "Emotion Recognition using Imperfect Speech Recognition," in INTERSPEECH, 2010, http://www.cs.cmu.edu/~fmetze/interACT/Publications_files/publications/emo-asr_is.pdf, 4 pages.
Miao, Y., et al., "EESEN: End-To-End Speech Recognition Using Deep Rnn Models and WFST-Based Decoding," in ASRU, 2015, http://www.cs.cmu.edu/~fmetze/interACT/Publications_files/publications/eesenasru.pdf, 8 pages.
Neto, J., et al., "Speaker-Adaptation for Hybrid Hmm-Ann Continuous Speech Recognition System," in EUROSPEECH, 1995, https://www.researchgate.net/profile/Ciro_Martins/publication/2421983_Speaker-Adaptation_For_Hybrid_Hmm-Ann_Continuous_Speech_Recognition_System/links/0c9605186c6a9dcde0000000/Speaker-Adaptation-For-Hybrid-Hmm-Ann-Continuous-Speech-Recognition-System.pdf?origin=publication_detail, 5 pages.
Pandit, V. and Schuller, B., "On Many-To-Many Mapping Between Concordance Correlation Coefficient snd Mean Square Error," arXiv:1902.05180, 2019, https://arxiv.org/pdf/1902.05180.pdf.
Preoţiuc-Pietro, D., et al., "Modelling Valence and Arousal in Facebook Posts," in WASSA, 2016, http://wwbp.org/papers/va16wassa.pdf, 7 pages.
Radford, A., "Learning to Generate Reviews and Discovering Sentiment," arXiv:1704.01444, 2017, https://arxiv.org/pdf/170401444.pdf, 9 pages.
Rozgić, V., et al., "Emotion Recognition Using Acoustic and Lexical Features," in INTERSPEECH, 2012, https://pdfs.semanticscholar.org/5259/39fff6c81b18a8fab3e502d61c6b909a8a95.pdf?_ga=2.28666044.1226002713.1582334499-1985355348.1527123823, 4 pages.
Rozgic, V., et al., "Multi-Modal Prediction of PTSD and Stress Indicators," in ICASSP, 2014, 5 pages.
Schuller, B., et al., "Emotion Recognition from Speech: Putting ASR in the Loop," in ICASSP, 2009, https://www.researchgate.net/profile/Anton_Batliner/publication/224929707_Emotion_Recognition_from_Speech_Putting_ASR_in_the_Loop/links/0fcfd50f6bb1a766a1000000/Emotion-Recognition-from-Speech-Putting-ASR-in-the-Loop.pdf?origin=publication detail, 5 pages.
Schuller, B.W., "Speech Emotion Recognition," Communications of the ACM, vol. 61, No. 5, pp. 90-99, 2018, 10 pages.
Seyeditabari, A., et al., "Emotion Detection in Text: A Review," arXiv:1806.00674, 2018, https://arxiv.org/pdf/1806.00674.pdf, 14 pages.
Stuhlsatz, A., et al., "Deep Neural Networks for Acoustic Emotion Recognition: Raising the Benchmarks," in ICASSP, 2011, https://mediaturn.ub.turn.de/doc/1107313/file.pdf, 4 pages.
Xiao, Y. and Cho, K., "Efficient Character-Level Document Classification by Combining Convolution and Recurrent Layers," arXiv:1602.00367, 2016, https://arxiv.org/pdf/1602.00367.pdf, 10 pages.
Yao, K., et al., "Adaptation of Context-Dependent Deep Neural Networks for Automatic Speech Recognition," in SLT, 2012, https://www.microsoft.com/en-us/research/wp-content/uploads/2016/02/0000366.pdf, 4 pages.
Yoon, S., et al., "Multimodal Speech Emotion Recognition Using Audio and Text," in SLT, 2018, https://arxiv.org/pdf/1810.04635.pdf, 7 pages.
Zhang, B., et al., "Exploiting Acoustic and Lexical Properties of Phonemes to Recognize Valence from Speech," in ICASSP, 2019, http://web.eecs.umich.edu/~emilykmp/EmilyPapers/2019_Zhang_ICASSP.pdf, 5 pages.
Zhang, X., et al., "Character-level Convolutional Networks for Text Classification," in NIPS, 2015, http://papers.nips.cc/paper/5782-character-level-convolutional-networks-for-text-classification.pdf, 9 pages.

* cited by examiner

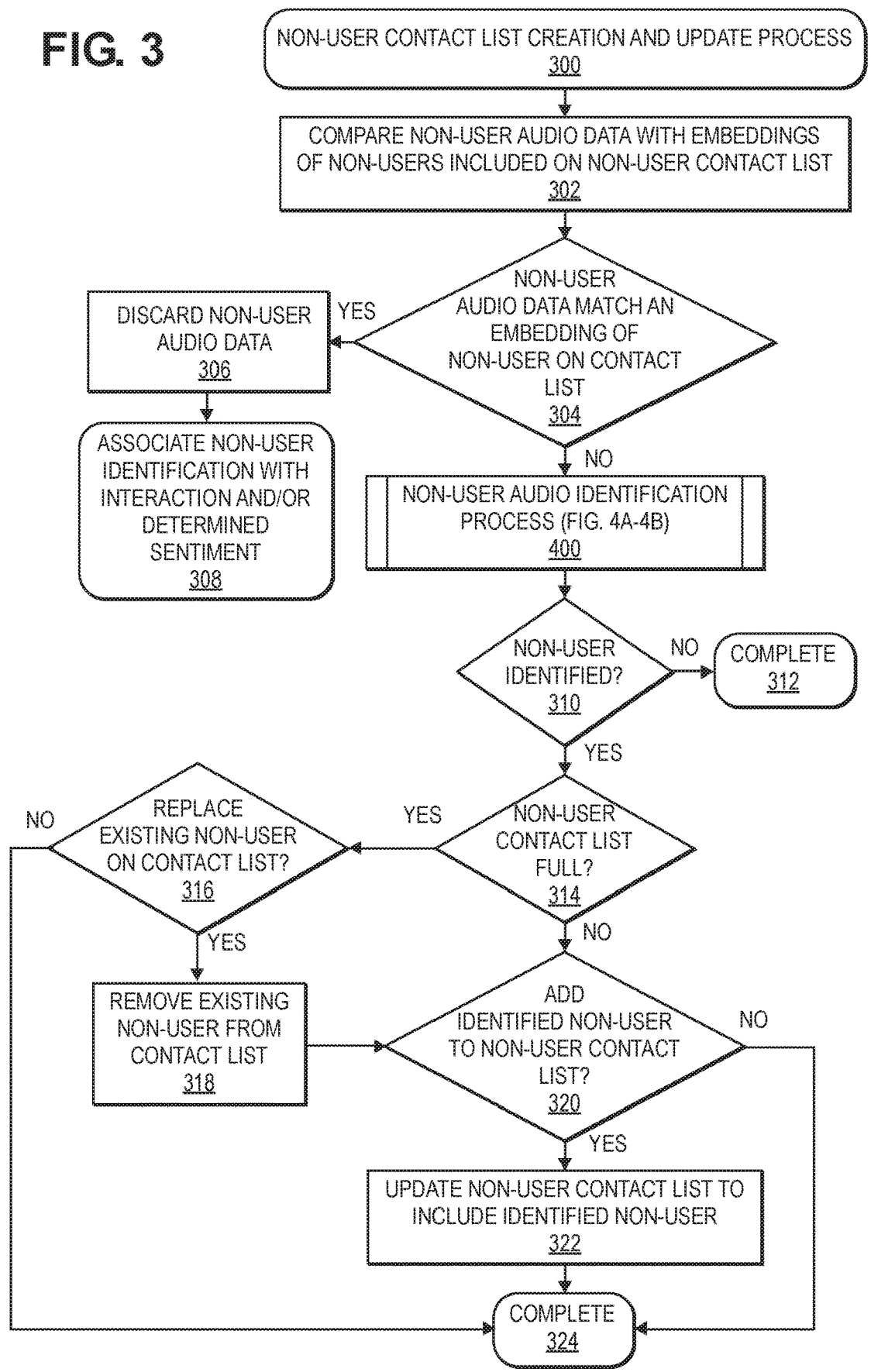

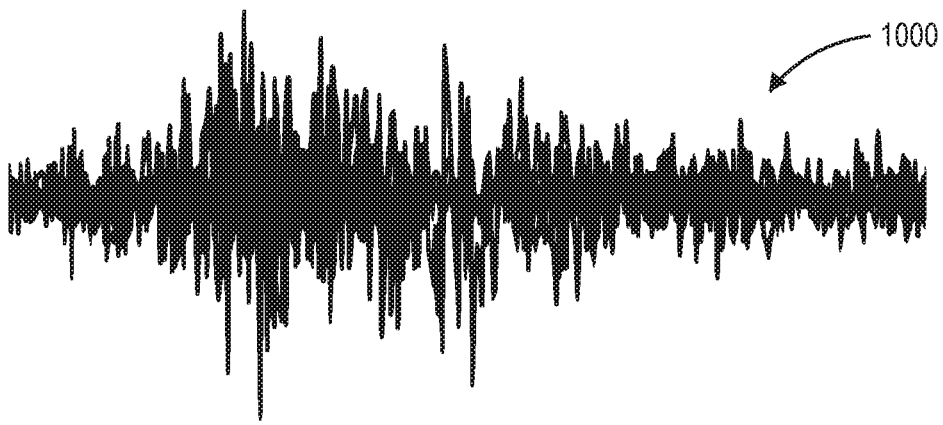
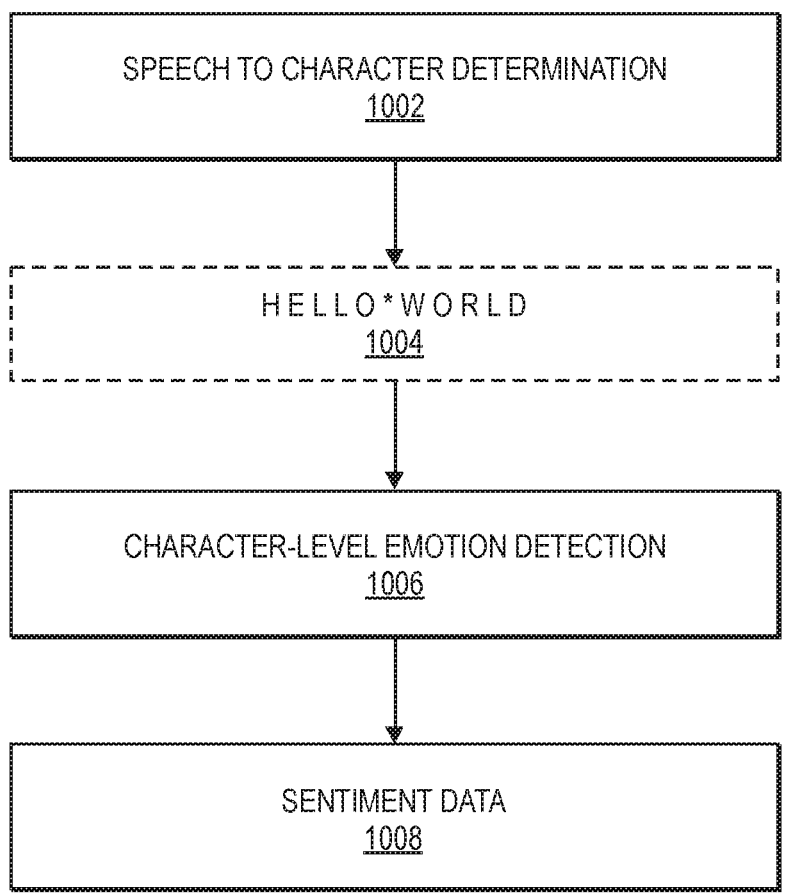
FIG. 10

INTERACTION EMOTION DETERMINATION

BACKGROUND

Participants in a conversation or interaction may be affected by the emotional state of one another as perceived by their voice. For example, if a speaker is excited, a listener may perceive that excitement in their speech. However, a speaker may not be aware of the emotional state that may be perceived by others as conveyed by their speech. Likewise, a speaker may not be aware of how the other participants with which they interact may impact the emotional state of the participant.

BRIEF DESCRIPTION OF FIGURES

FIG. 3 is an example flow diagram of a non-user contact list creation and update process, in accordance with described implementations.

FIG. 10 illustrates a block diagram of the conversion of speech to sentiment data, in accordance with described implementations.

DETAILED DESCRIPTION

Figure 1A:
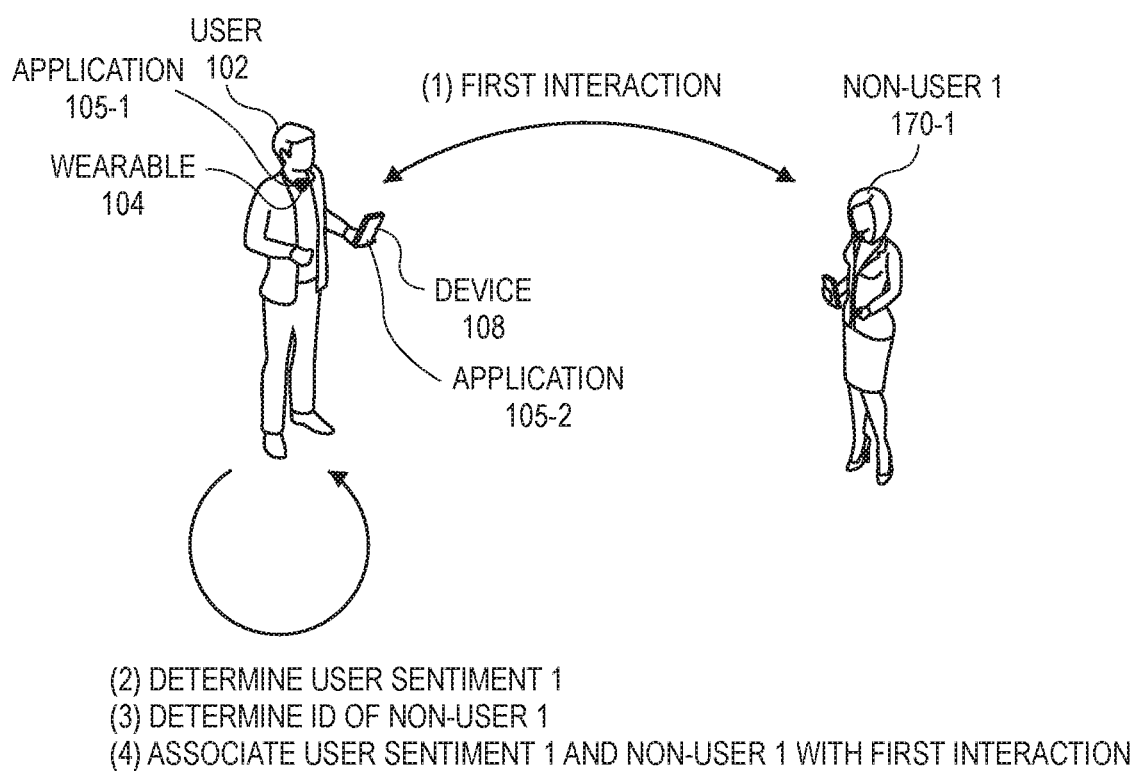
FIGS. 1A through 1C are transition diagrams illustrating interactions between a user and different non-users, determinations of the user's sentiment during those interactions, and determining the identity of the non-user, in accordance with described implementations.

A person's wellbeing and emotional state are interrelated. A poor emotional state can directly impact a person's health, just as an illness or other health events may impact a person's emotional state. A person's emotional state may also impact others with which they communicate and/or others with which a person communicates may impact that person's own emotional state. For example, a person who speaks with someone in an angry tone may produce in that listener an anxious emotional response. Accordingly, the context surrounding an emotional state is important.

Information about the emotional state that an individual is expressing may be useful to the individual. Other information about the interaction, such as who the individual was interacting with, the location, time, duration, etc., of the interaction may also be helpful. For example, if a person is speaking to their friend in an angry or aggressive tone, the friend may let them know. With that awareness, the person may then be able to modify their behavior. As useful as this feedback is, it is infeasible to have a friend constantly present who is able to tell a person the emotional state expressed in their voice.

Described in this disclosure is a system and method that processes characters to determine sentiment data indicative of the emotional state of a user of the system during an interaction with another person (referred to herein as a non-user). The system and methods also determine, for frequent interactions with the same non-user(s), the context surrounding the interaction including, but not limited to, the identity of the non-user.

Sentiment data for the user may be determined, for example, by converting speech or audio data generated by the user into characters, such as the characters of the words spoken by the individual. As discussed further below, character determination from audio may be generated without actually determining the words conveyed in that audio. The characters may then be further processed to determine sentiment data corresponding to an emotion of the individual (the user). In another example, characters from texts or other character based messaging generated by the user may also be processed to determine sentiment data corresponding to an emotional state of the user.

The context surrounding the interaction, and in particular the identity of the non-user, may be determined based on second speech or audio data generated by the non-user with which the user was interacting. For example, the second audio data, without determining the words conveyed in the second audio data, may be compared with stored embedding vectors corresponding to other non-users that have already been identified and determined to be frequently interacted with by the user (referred to herein as identified non-users) and/or with stored embedding vectors corresponding to non-users that the user has previously interacted with but have not been identified (referred to herein as unidentified non-users). If the second audio data is determined to match one of the stored embeddings corresponding to an identified non-user, the non-user is identified as the identified non-user corresponding to the stored embedding vector. If the second audio data is determined to match one of the stored embeddings corresponding to an unidentified non-user, an interaction count for the unidentified non-user is increased. If the interaction count exceeds a minimum interaction threshold, the identity of the non-user may be determined. Non-user identification may include, but is not limited to, requesting that the user identify the non-user. Other identification techniques are discussed further below.

Finally, if the second audio data does not match a stored embedding vector, the second audio data is further processed to generate an embedding vector representative of the second audio data. The generated embedding vector may then be stored as representative of an unidentified non-user and included in the plurality of stored embedding vectors with which audio data from non-users during future interactions are compared.

As discussed herein, the user may authorize the system to process their speech and/or other messaging, as well as authorize identification of non-users with which the user interacts. For example, the user may enroll and consent to acquisition and processing of audio data. Raw audio data acquired from one or more microphones is processed to segment the audio data between user audio data and non-user audio data. The user audio data may then be further processed to generate character data from the audio data, the character data including characters determined from the audio data. The character data is then processed to determine sentiment data corresponding to an emotional state of the user during the interaction. After the character data is generated, the audio data of the particular user may be discarded. Likewise, after processing the non-user audio data as discussed herein, the non-user audio data may be discarded A wearable device and/or other portable device of the user may be used to acquire the raw audio. For example, the wearable device may comprise a band, bracelet, necklace, earring, brooch, and so forth. The wearable device may comprise one or more microphones and a computing device. The wearable device may be in communication with another device, such as a smartphone. The wearable device may provide audio data to the smartphone for processing. In other implementations, the wearable device may perform some or all of the processing discussed herein. In still other examples, the smartphone or other device may record the raw audio and process the audio data, as discussed herein. In other implementations, the functionality of the system as described may be provided by a single device or distributed across other devices.

The sentiment data is determined by analyzing characteristics of the user's speech as expressed in the audio feature data. Changes over time in pitch, pace, and so forth may be indicative of various emotional states. For example, the emotional state of speech that is described as "excited" may correspond to speech which has a greater pace while slower paced speech is described as "bored." In another example, an increase in average pitch may be indicative of an emotional state of "angry" while an average pitch that is close to a baseline value may be indicative of an emotional state of "calm." Various techniques may be used individually or in combination to determine the sentiment data including, but not limited to, signal analysis techniques, classifiers, neural networks, and so forth. The sentiment data may be provided as numeric values, vectors, associated words, and so forth.

Figure 1B:
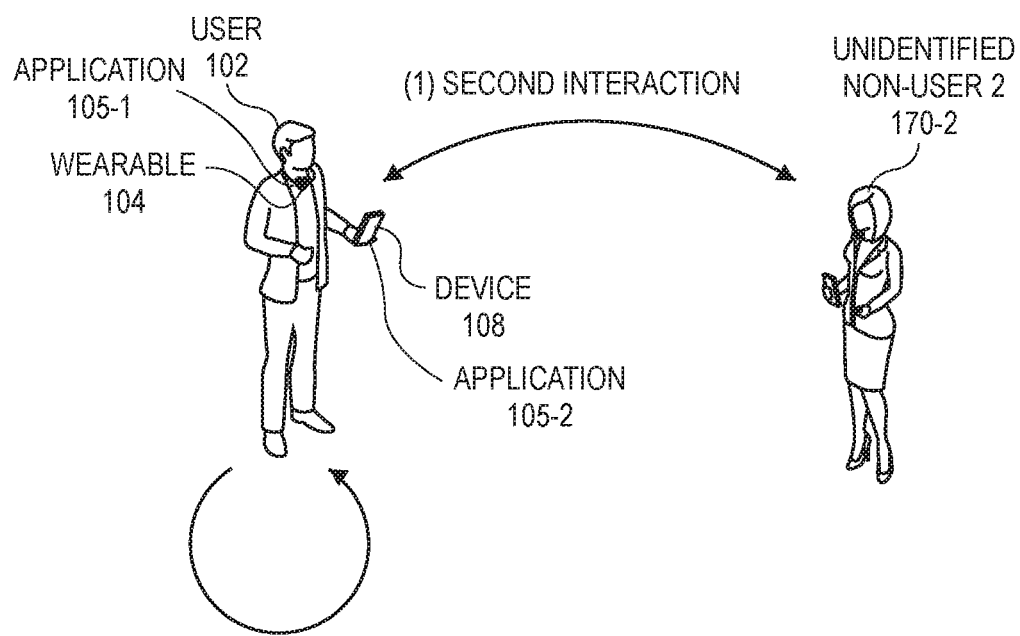
Figure 1C:
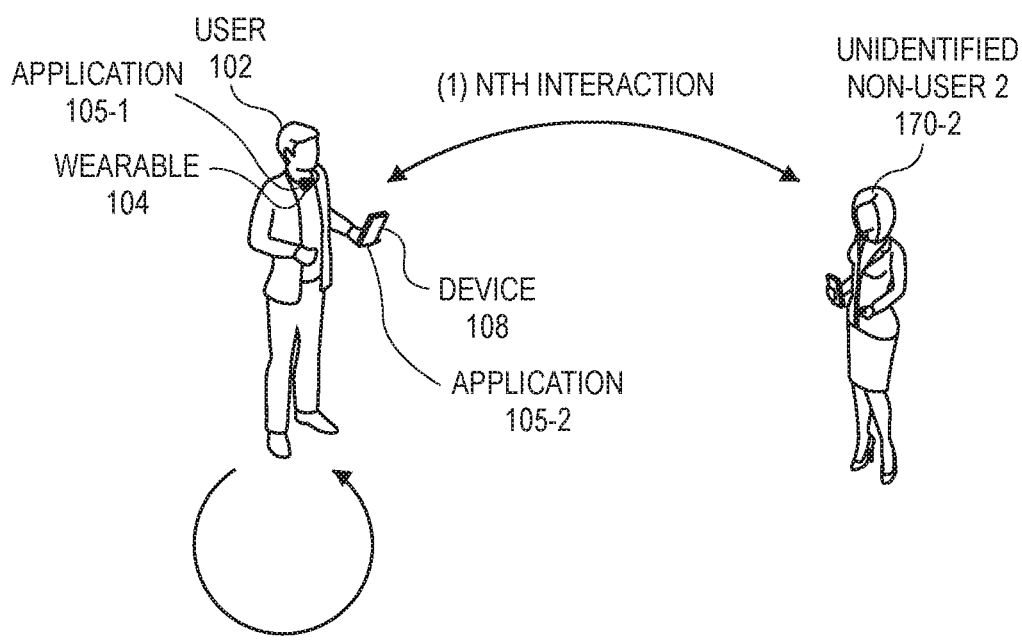

FIGS. 1A through 1C are transition diagrams illustrating interactions between a user and different non-users, determinations of the user's sentiment during those interactions, and determining the identity of the non-user, in accordance with described implementations.

During a typical day a user may interact with any number of people (non-users) for a variety of purposes. In accordance with the disclosed implementations, the user 102 is a person utilizing a wearable device 104 and/or a user device 108 that is operable to perform some or all of the aspects of the disclosed implementations. A non-user is any person with which the user interacts, such as non-user 1 170-1.

As illustrated in FIG. 1A, the user 102 may engage in a first interaction with non-user 1 170-1. The interaction may include any exchange of audio data (e.g., conversation) between the user 102 and the non-user 1 170-1. As discussed in further detail below, the audio data is collected by microphones on the wearable device 104 and/or on the user device 108. The collected audio data may then be segmented by an application 105-1/105-2 executing on the wearable device 104 or the user device 108 into user audio data that includes speech generated by the user 102 and non-user audio data that includes speech generated by the non-user 1 170-1.

The application 105-1/105-2 may then process the user audio data to determine a user sentiment, sentiment 1, indicative of the emotional state of the user during the first interaction. As discussed further below, once the sentiment of the user is determined, the user audio data is discarded. Likewise, as discussed further below, in some implementations, the user audio data may be processed by the application 105-1 executing on the wearable device 108 alone, by the application 105-2 executing on the user device 108 alone, or by both applications 105-1/105-2 in combination. If all processing is performed on the wearable device, the user audio data may never leave the wearable device and may be discarded once processing is complete. If all processing is performed on the user device, the user audio data may be transmitted from the wearable device (or generated on the user device) and may never leave the user device. In such an implementation, once processing of the user audio data is complete, the user audio data may be discarded from the user device. In implementations in which some processing is performed on the wearable device and some processing is performed on the user device, the user audio data may be initially processed on the wearable device to determine characters and those characters may be sent from the wearable device to the user device for further processing. In such an implementation, the user audio data may never leave the wearable device and may be discarded once processing to determine characters is complete.

In addition to determining sentiment data for the user during the first interaction, the application 105-1/105-2 may process the non-user audio data to determine an identity of the first user or to determine that the identity of the first user is unknown. For example, the application 105-1/105-2 may compare at least a portion of the non-user audio data with stored embedding vectors representative of speech generated by identified non-users with which the user interacts and/or stored embedding vectors representative of speech generated by unidentified non-users with which the user 102 has previously interacted but are unknown to the application 105-1/105-2.

In the example illustrated in FIG. 1A, based on a comparison of the non-user audio data with stored embedding vectors, it is determined that non-user 1 170-1 is a non-user that has been previously identified. Upon identification of the non-user 1 170-1, the interaction count for that non-user is increased and the non-user is associated with the interaction and the sentiment data determined for the interaction. In addition, the time, location, date, etc., of the interaction may likewise be associated with the interaction for the user 102.

Referring now to FIG. 1B, illustrated is a second interaction between the user 102 and an unidentified non-user 2 170-2. The second interaction may include any exchange of audio data between the user 102 and the unidentified non-user 2 170-2. Similar to the above, the audio data may be collected by microphones on the wearable device 104 and/or the user device 108 and segmented by the application 105-1/105-2 executing on the wearable device 104 or the user device 108 into user audio data that includes speech generated by the user 102 and non-user audio data that includes speech generated by non-user 2 170-2.

The application 105-1/105-2 may then process the user audio data to determine a user sentiment, sentiment 2, indicative of the emotional state of the user during the second interaction. In addition to determining sentiment data for the user during the second interaction, the application 105-1/105-2 may process the non-user audio data to determine that the identity of the second user 170-2 is unknown to the application 105-1/105-2. For example, the application 105-1/105-2 may compare at least a portion of the non-user audio data with stored embedding vectors representative of speech generated by identified non-users with which the user interacts and/or stored embedding vectors representative of speech generated by unidentified non-users with which the user 102 has previously interacted but are unknown to the application 105-1/105-2.

In the example illustrated in FIG. 1B, based on a comparison of the non-user audio data with stored embedding vectors, it is determined that non-user 2 170-2 is unknown and that no stored embedding vector matches the non-user audio data. As a result, the application 105-1/105-2 generates, based at least in part on the non-user audio data, an embedding vector corresponding to the speech of the unidentified non-user 2 170-2 and stores the embedding vector in memory of the wearable device 104 and/or the memory of the user device 108 such that the embedding vector is accessible to the application 105-1/105-2 for use in comparing non-user audio data of future interactions by the user. In addition, the embedding vector is associated with the user sentiment 2 and the second interaction.

Notably, as illustrated in FIG. 1B, the user 102 is not notified or requested to identify the unidentified non-user. As discussed further below, in some implementations, a minimum interaction threshold of interactions with the same unknown non-user over a period of time must be exceeded before the user 102 is prompted to identify and/or confirm the identity of the unknown non-user. Such a threshold eliminates numerous prompts to the user, many of which may relate to interactions with non-users that the user may never interact with again and/or may only occasionally interact.

As the user continues over a period of time (e.g., two weeks) to interact, the disclosed implementations determine the user sentiment for each interaction, determine if the non-user or non-users participating in the interaction are known, increases an interaction count for each unknown non-user with which the user has previously interacted, and generates embedding vectors corresponding to speech from non-users that are newly interacted with by the user.

Referring now to FIG. 1C, a user 102 participates in an Nth interaction with unidentified non-user 2 170-2. As discussed in FIGS. 1A and 1B, the audio data of the interaction is segmented into user audio data and non-user audio data and the user audio data is further processed to determine the sentiment of the user during the Nth interaction. Likewise, the non-user audio data is compared with stored embedding vectors associated with identified non-users and/or unidentified non-users. However, because an embedding vector for unknown non-user 2 170-2 was originally generated and stored in response to the interaction between the user 102 and the unknown non-user 2 170-2 (FIG. 1B), as illustrated in FIG. 1C, the non-user audio data is determined to correspond to the stored embedding vector that corresponds to unidentified non-user 2 170-2. In response to determining that the non-user audio data corresponds to the stored embedding vector for unidentified non-user 2 170-2, an interaction count for that unidentified non-user is increased.

Likewise, in this example, it is determined that the interaction count exceeds a minimum interaction threshold. The minimum interaction threshold may be any number and may vary for different users and/or vary based on just the quantity of interactions with a non-user and/or based on the frequency of those interactions, etc.

In response to determining that the interaction count exceeds the minimum interaction threshold, the identity of the non-user 2 170-2 is determined. For example, the application 105-2 may present a request on a display of the user device 108 asking the user to confirm the identity of the non-user they just interacted with. Such a notification may also indicate the date, time, place, etc., of other interactions between the user and that non-user. In still other examples, other information, referred to herein as supplemental information, may be used to determine potential identities of the non-user. For example, if the application 105-1/105-2 has access to a calendar of the user, the calendar may be quired to determine if there is a non-user or group of non-users with which the user has scheduled meetings that coincide with the date and time of the interactions.

As discussed further below, the user may view sentiment data for different interactions, interactions during different points in time, interactions with particular non-users, etc. Such information may help guide the user in adjusting their behavior to certain non-users, altering their schedule to better align meetings with the user's emotional state, etc.

Figure 2:
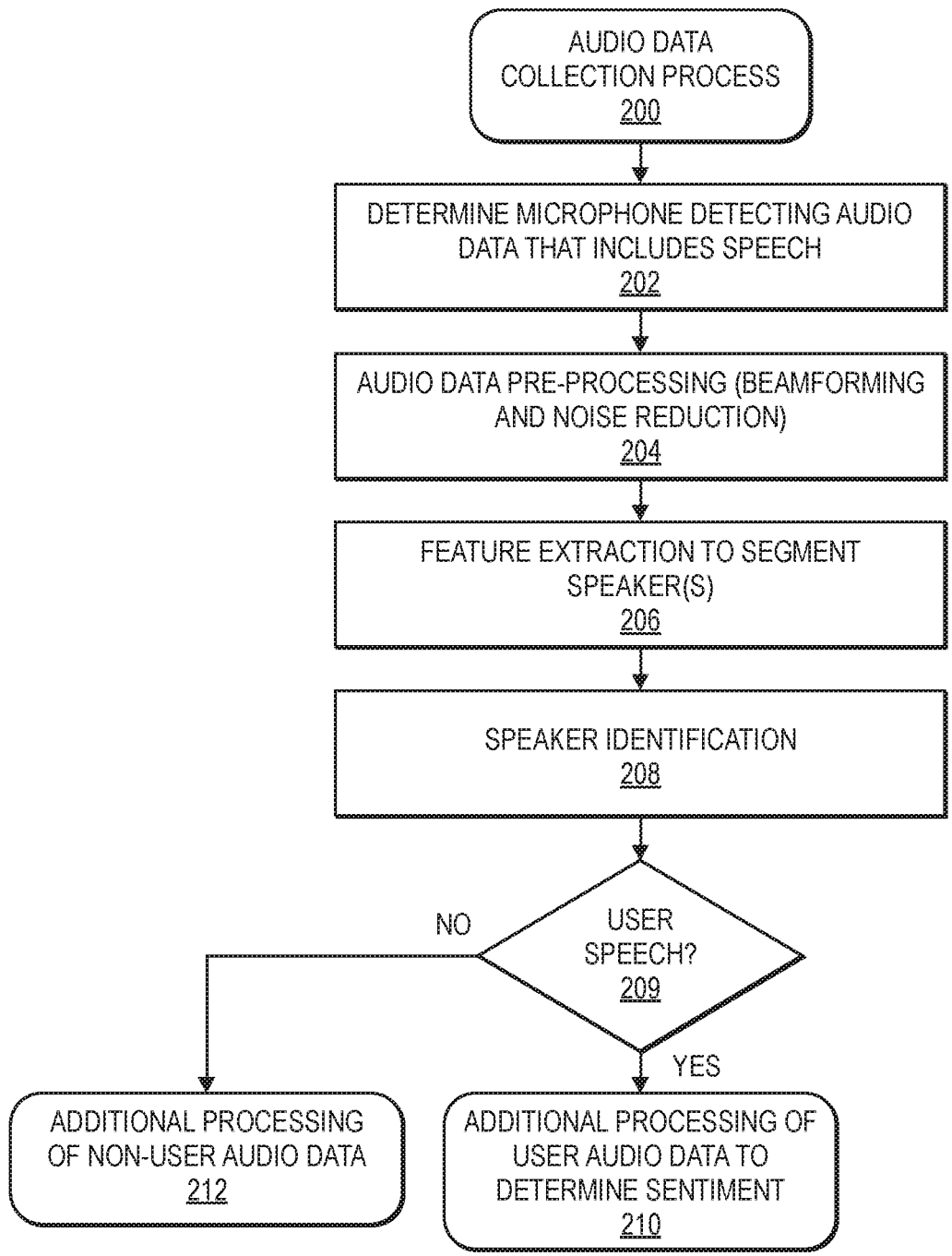
FIG. 2 is an example flow diagram of an audio data collection process, in accordance with described implementations.

FIG. 2 is an example flow diagram of an audio data collection process 200, in accordance with described implementations.

The example process 200 begins upon a determination that the microphone of the wearable device is detecting speech in generated audio data, as in 202. For example, detected audio data may be processed by a voice activity detector ("VAD") of a wearable device to determine if the audio data includes speech or voice data representative of a human voice.

Upon determining that speech is detected in the audio data, collection of the audio data continues, and audio data pre-processing occurs, as in 204. Audio data pre-processing may include but is not limited to beamforming of the microphone to focus the audio data collection in a direction of a source of the voice data. For example, if the wearable device includes an array of microphones, the time-difference-of-arrival ("TDoA") of the voice data at each microphone of the microphone array may be used to determine a direction toward the source of the voice data. Likewise, in some implementations, noise reduction, through use of filters or other pre-processing techniques, may be performed on the received audio data to eliminate or reduce background noises that are included in the audio data with the speech.

Feature extraction may also be performed on the audio data to segment the audio data between different speakers (i.e., different voices) included in the audio data, as in 206. For example, the audio data may be processed to determine spectral features corresponding to each voice detected in the audio data and different sets of spectral features segmented into different segments.

As the audio data is segmented into the different speakers (user, non-user(s)), the segments of audio may be further processed to determine if the speech represented in each segment corresponding to a speech of the user associated with or wearing the wearable device, as in 208. For example, a digital signal processor ("DSP") or long short-term memory ("LSTM") network may be used to further process the audio data segments and compare those segments with a known speech pattern (e.g., vocal tones and frequencies) of the user associated with the wearable device. A determination may then be made as to whether the data segment corresponds with the user associated with the wearable device or does not correspond with the user associated with the wearable device—i.e., corresponds to a non-user, as in 209. For data segments that are determined to include audio data of the user associated with the wearable device, additional processing of that audio data may be performed to determine the sentiment of the user during the interaction, as in 210, and as discussed further below. For data segments that are determined to include audio data of a non-user, the audio data may be further processed as discussed below, as in 212.

FIG. 3 is an example flow diagram of a non-user contact list creation and update process 300, in accordance with described implementations.

As discussed herein, a non-user contact list is a list of identified non-users that have been identified and associated with a user as non-users with which the user frequently interacts. In some implementations, the non-user contact list may only include a small number of non-users (e.g., 4-5 non-users). In other implementations, the non-user contact list may be larger or smaller. The non-user contact list may be used to determine which non-users are to be identified in interactions and associated with those interactions. As discussed further below, in such an implementation, non-user audio data may only be compared with stored embedding vectors corresponding to non-users included on the non-user contact list. If a match is not determined between the non-user audio data and one of the stored embedding vectors associated with the non-user contact list, processing may terminate and the interaction may be indicated as an interaction with an unidentified non-user. In other implementations, for any unidentified non-users, an embedding vector may be generated and stored and used for future comparisons with non-user audio data to determine new non-users that may become frequent interactions with the user.

In some implementations, a user may specify what non-users are to be included on the non-user contact list, regardless of the frequency of interaction. For example, a user may specify a particular non-user, such as a family member, to be included on the non-user contact list even though the user may not interact with that person with high frequency because the user may be interested in their emotional state during interactions with that non-user.

Returning to FIG. 3, after comparing the non-user voice data with stored embedding vectors of non-users included on the non-user contact list, as in 302, a determination is made as to whether the voice data matches any of the stored embedding vectors corresponding to non-users included on the contact list, as in 304. If a match is determined, the non-user audio data is discarded, as in 306, and the identified non-user is associated with the interaction and/or the sentiment determined for the interaction, as in 308. The association may be stored in a memory of the wearable device or the user device and accessible to the example process 300, which may be in the form of an application executing on the wearable device or the user device.

If it is determined that the non-user audio data does not match an embedding vector corresponding to a non-user included on the non-user contact list, the non-user audio identification process is performed, as in 400 and as discussed further below with respect to FIGS. 4A through 4B. Upon completion of the example process 400, a determination is made as to whether the non-user was identified, as in 310. The response from the example process 400 may be either an identification of the non-user or an indication that the non-user was not identified.

If it is determined that the non-user was not identified, the example process 300 completes, as in 312. If it is determined that the non-user was identified, a determination may be made as to whether the non-user contact list is full, as in 314. As discussed above, the non-user contact list may be any size from small to infinite. If it is determined that the non-user contact list is full, a determination may be made as to whether an existing non-user on the non-user contact list should be replaced with the newly identified non-user, as in 316. Determining if a non-user on the non-user contact list is to be replaced may be in response to an indication by the user to update the contact list. In other examples, the frequency of interactions with non-users already on the non-user contact list may be monitored and, if the frequency of interactions decreases or stops, it may be determined that the non-user currently included on the non-user contact list should be replaced with the newly identified non-user. If it is determined that a non-user included on the non-user contact list to be replaced, the non-user is removed from the non-user contact list, as in 318.

After removing a non-user from the non-user contact list or if it is determined that the non-user contact list is not full, a determination may be made as to whether to add the newly identified non-user to the non-user contact list, as in 320. For example, a notification may be sent to the user asking the user if the newly identified non-user is to be included on the non-user contact list.

If it is determined that the newly identified non-user is to be added to the non-user contact list, the newly identified user is added to the non-user contact list, as in 322. If it is determined that the newly identified non-user is not to be added to the non-user contact list, after determining that an existing non-user included on the contact list is not to be excluded, or after adding the newly identified non-user to the non-user contact list, the example process 300 completes, as in 324.

Figure 4A:
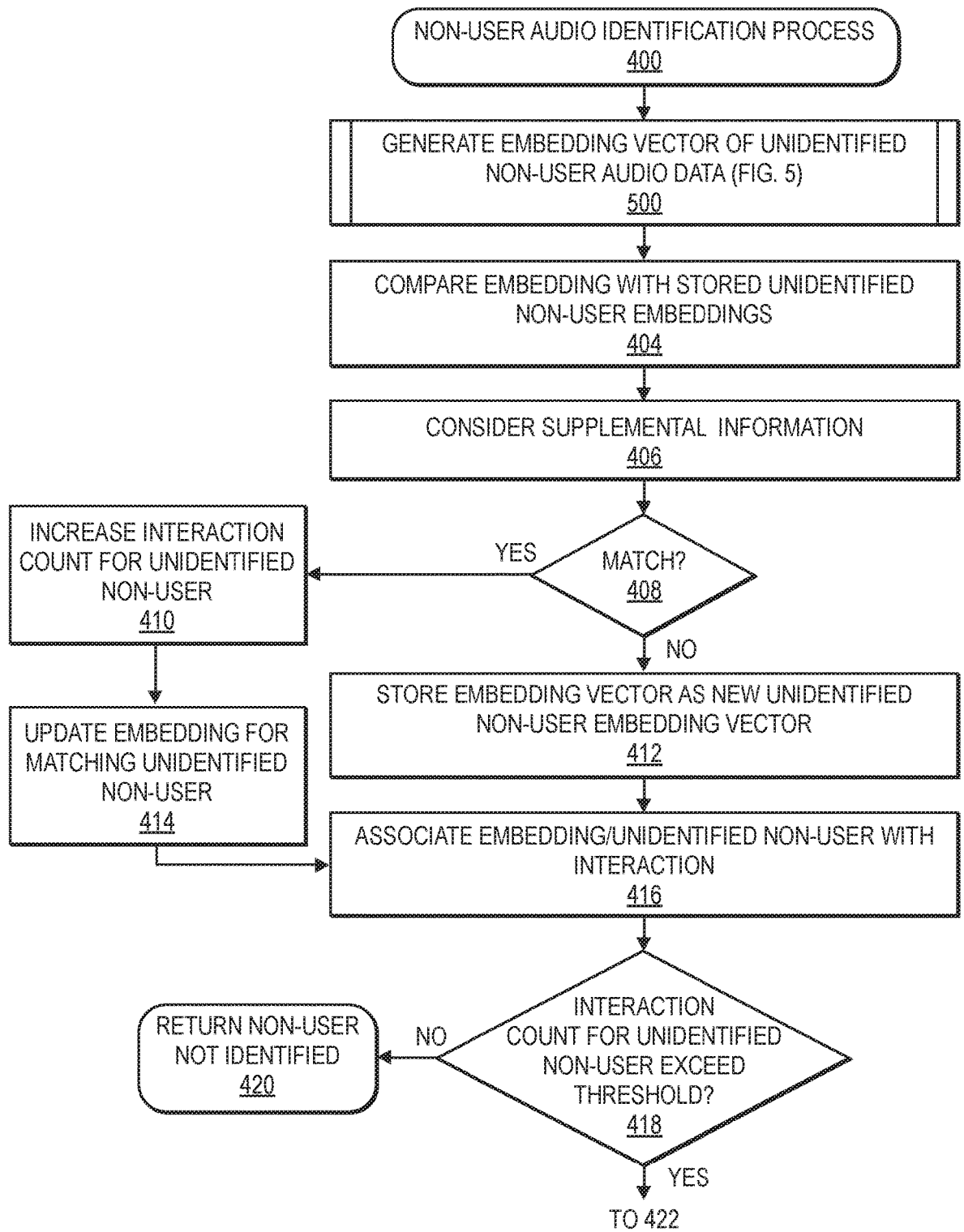
FIGS. 4A through 4B is an example flow diagram of a non-user audio identification process, in accordance with described implementations.
Figure 4B:
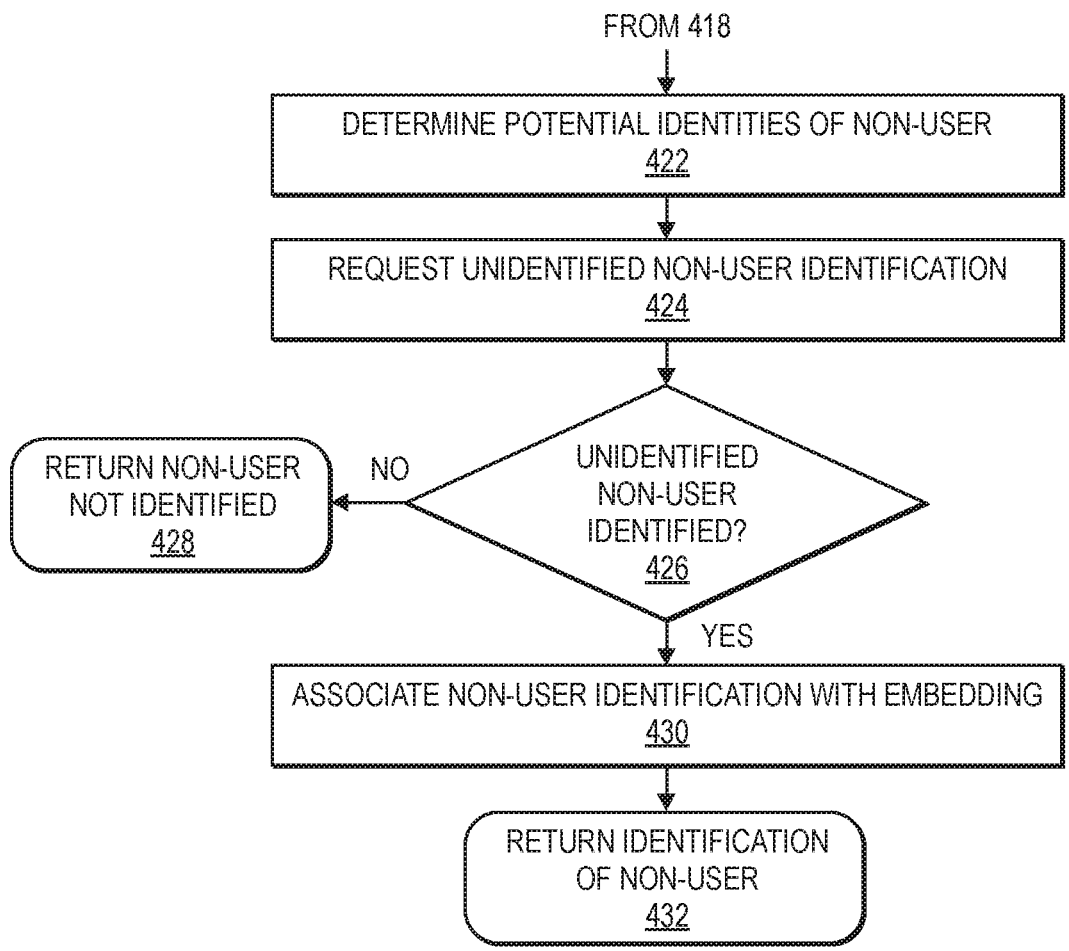

FIGS. 4A through 4B is an example flow diagram of a non-user audio identification process 400, in accordance with described implementations.

The example process 400 begins by executing the generate embedding vector of unidentified non-user audio data process, as in 500 and as discussed further below with respect to FIG. 5. As discussed further below, an embedding vector for an unidentified non-user may be generated based on a plurality of non-user audio data segments collected during an interaction between the user and the unidentified non-user.

The non-user embedding vector returned from the example process 500 may be compared with stored unidentified non-user embedding vectors that were generated from audio data of prior interactions between the user and other unidentified non-users, as in 404. For example, the embedding vectors may be compared in an embedding space to determine if the non-user embedding vector is within a defined distance of a stored embedding vector. As is known, the less the distance between two embedding vectors in an embedding space, the higher the similarity between the embedding vectors and the correspondingly represented information.

In addition to comparing the non-user embedding vector with stored embedding vectors, supplemental information may also be considered, as in 406. For example, if the non-user embedding vector is generating during a meeting that includes unknown non-user 1, other stored unknown embedding vectors generated during other meetings that also include unknown non-user 1 may be compared to determine the similarity between the embedding vectors.

A determination may then be made based on the comparison of the non-user embedding vector with the stored embedding vectors, and optionally considering supplemental information, whether a match is identified, as in 408. A match may be determined, for example, if the distance between the unidentified non-user embedding vector and stored embedding vector is within a defined similarity value.

If a match is determined, an interaction count for the unidentified non-user corresponding to the stored embedding vector determined to match the generated embedding vector is increased to represent another interaction between the user and that unidentified non-user, as in 410. Likewise, the stored embedding vector may be updated to include the generated embedding vector for the unidentified non-user, as in 414. For example, the stored embedding vector and the generated embedding vector may be merged, averaged, or otherwise combined to generate an updated stored embedding vector for the unidentified non-user.

Returning to decision block 408, if it is determined that there is no match between the generated embedding vector and a stored embedding vector, the generated embedding vector is stored as a stored embedding vector corresponding to a new unidentified non-user, as in 412.

After storing the embedding vector at block 412, or after updating an already stored embedding vector at block 414, the embedding vector and the unidentified non-user are associated with the interaction, as in 416. For example, the association between the unidentified non-user, the embedding vector, the interaction, and/or the determined sentiment data of the user during the interaction may be stored by the application executing on the wearable device and/or the user device in a memory of the wearable device and/or the user device so that the association, the embedding vector, the interaction, and/or the determined sentiment are accessible to the application.

A determination may then be made as to whether an interaction count for the identified non-user exceeds a minimum interaction threshold, as in 418. As noted above, each time the unidentified non-user is determined to be part of an interaction with the user, an interaction count is increased for that non-user. If it is determined that the interaction count does not exceed the minimum interaction threshold, the example process 400 returns an indication that the non-user remains unidentified, as in 420. Turning now to FIG. 4B, if it is determined that the interaction count exceeds the minimum interaction threshold, potential identities of the unidentified non-user may be determined, as in 422. Potential identities may be determined, for example, based on supplemental information accessible to the example process 400. Supplemental information may include, but is not limited to, calendar data of the user, location data corresponding to a location of the user during each interaction that is determined to include the unidentified non-user, time of day, day of week, etc. The supplemental information may be processed to determine if there are one or more recurring non-users that are potentially the unidentified non-user. For example, calendar entries corresponding to the times of each interaction determined to include the unidentified non-user may be considered to determine if there is an identity of a non-user in some or all of those calendar entries. If there are one or more non-users identified in the calendar entries, those one or more non-users may be determined to be potential identities of the non-user.

A request may then be presented, for example on a display of the user device, to the user requesting that the user identify the unidentified non-user, as in 424. The request may include identities of potential non-users matching the unidentified non-user. Alternatively, if no potential non-user identities were determined, the request may just be a request that the user identify the non-user that was involved in the interaction. In addition to providing potential non-user identities and/or requesting identification of the non-user, the request may also indicate other interactions the user has had with the unidentified non-user and/or the sentiment data corresponding to those interactions. Still further, in some examples, the request may also ask if the user would like to add the non-user, once identified, to the contact list for the user.

After presenting the request, a determination is made as to whether the identity of the non-user has been provided or confirmed by the user, as in 426. If it is determined that the identity of the non-user has not been provided or confirmed, the example process 400 completes and returns an indication that the non-user has not been identified, as in 428. If it is determined that the identity of the non-user has been provided or confirmed by the user, the identity is associated with the embedding vector created for that non-user and stored in memory as an identified non-user, as in 430. Finally, the example process 400 returns the identification of the non-user, as in 432.

Figure 5:
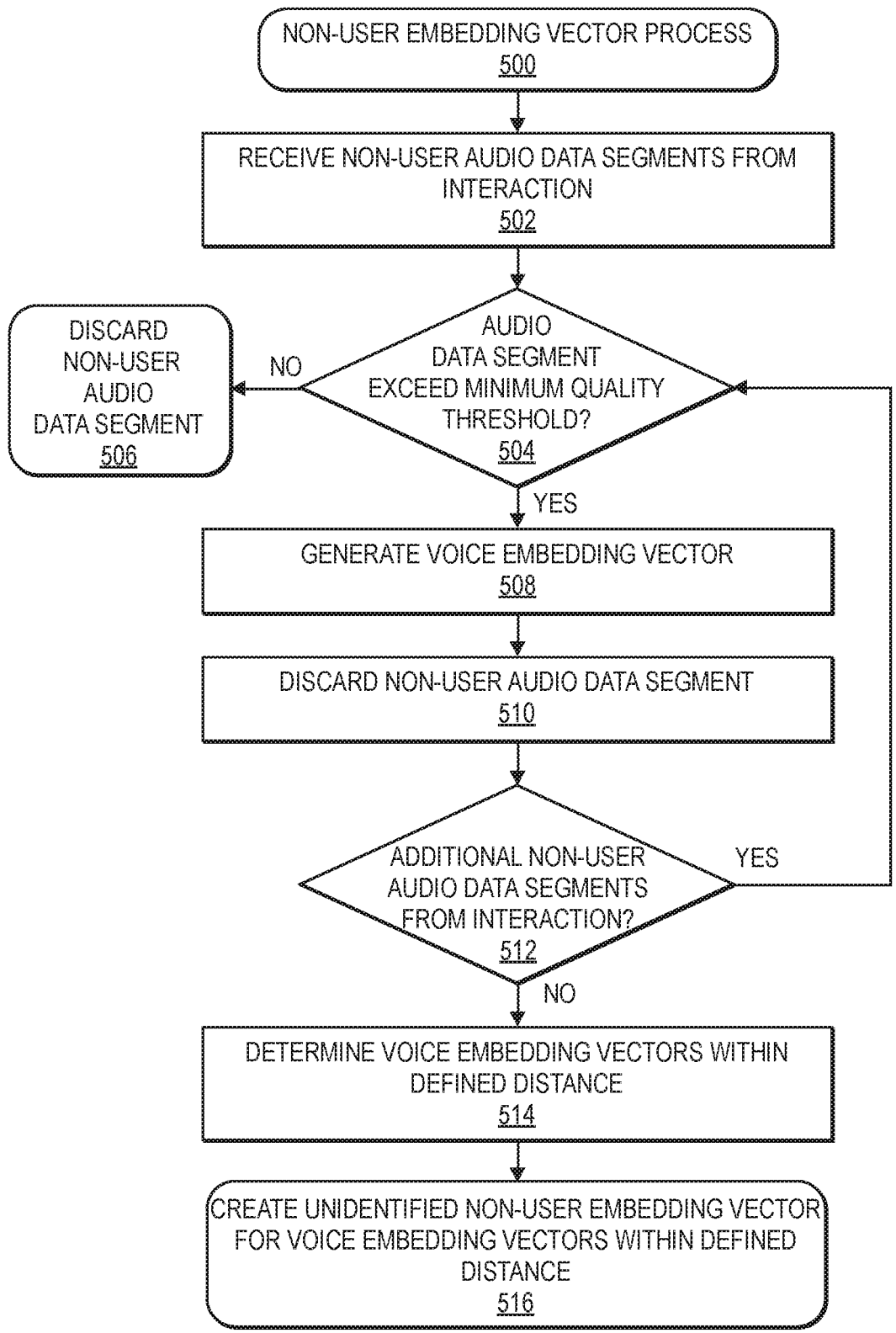
FIG. 5 is an example flow diagram of a non-user embedding vector process, in accordance with described implementations.

FIG. 5 is an example flow diagram of a non-user embedding vector process 500, in accordance with described implementations.

The example process 500 begins upon receipt of non-user voice data segments from an interaction between a user and one or more non-users, as in 502. As discussed above, audio data from an interaction may be segmented using one or more segmentation algorithms into non-user audio data segments and user audio data segments.

For each non-user audio data segment, a determination is made as to whether the audio data segment exceeds a minimum quality threshold, as in 504. For example, the non-user audio data segment may be processed to determine the amount of background noise, crosstalk, etc., and the quality of the speech or voice data signal included in the audio data segment and a quality score generated for each audio data segment.

If the quality score for a non-user audio data segment does not exceed the minimum quality threshold, the audio data segment is discarded, as in 506. However, if the quality of the non-user audio data segment does exceed the minimum quality audio data threshold, a voice embedding vector is generated for the audio data segment, as in 508. In addition, upon generation of the voice data embedding vector, the audio data segment may be discarded, as in 510.

The example process 500 then determines if additional non-user audio data segments from the interaction remain for processing, as in 512. If it is determined that there are additional non-user audio data segments that remain for processing, the example process 500 returns to block 504 and continues.

Once all the non-user audio data segments have been processed, a determination is made as to whether there are a group, or groups, of voice embedding vectors within a defined distance of one another within an embedding space, as in 514. Each grouping or cluster of voice embedding vectors in the embedding space may be representative of different non-users involved in an interaction with the user. For example, if there are fifty generated voice embedding vectors for an interaction and twenty of the voice embedding vectors are within a defined distance of one another in the embedding space (a first cluster of voice embedding vectors) and thirty of the generated voice embedding vectors are within a defined distance of one another (a second cluster of voice embedding vectors), it may be determined that the two clusters of voice embedding vectors each represent a different non-user that was involved in the interaction with the user.

For each cluster of voice embeddings that are within a defined distance of one another within the embedding space, an unidentified non-user embedding vector is generated as representative of that cluster of voice embedding vectors, as in 516. Generation of a representative unidentified non-user embedding vector may be done by combining, averaging, aggregating, or otherwise the voice embedding vectors of a cluster of voice embedding vectors. In other implementations, one of the existing voice embedding vectors may be selected and used as the unidentified non-user embedding vector for the cluster.

As discussed above, the unidentified non-user embedding vectors may be stored in memory of the wearable device or the user device and used for comparison with future non-user audio data to determine recurring interactions with the non-user and if enough interactions occur with that non-user to request an identification of that non-user. In other implementations, the generated unidentified non-user embedding vectors may be exchanged with other users of the disclosed implementations and utilized to identify those unidentified non-users. Likewise, in some implementations, user embedding vectors generated for users of the disclosed implementations, may in some implementations be shared with other users to provide identified embedding vectors.

Figure 6:
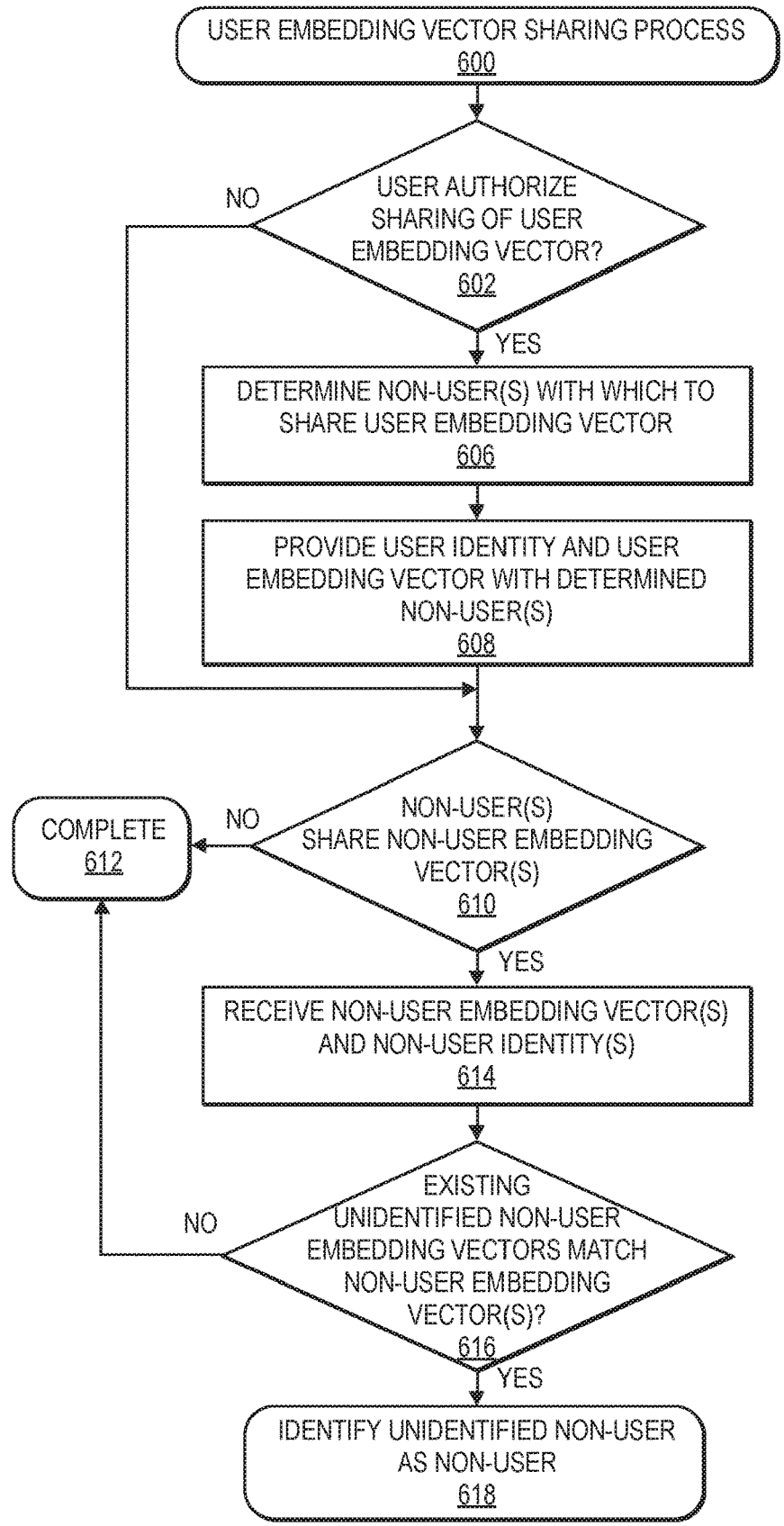
FIG. 6 is an example flow diagram of a user embedding vector sharing process, in accordance with described implementations.

FIG. 6 is an example flow diagram of a user embedding vector sharing process 600, in accordance with described implementations.

The example process 600 begins by determining if the user has authorized sharing of the embedding vector generated for that user as representative of speech of that user, as in 602. If it is determined that the user has not authorized sharing of the embedding vector generated for that user, the example process 600 proceeds to decision block 610 and continues as discussed below.

If it is determined that the user has authorized sharing of the user embedding vector generated for that user, one or more non-users are determined for which the user embedding vector is to be shared, as in 606. For example, the user may identify one or more non-users that are to receive the user embedding vector.

For each determined non-user, the user embedding vector and the identity of the user is shared with the non-user, or an application executing on a user device or wearable device of that non-user, as in 608.

In addition to sharing the user embedding vector with one or more non-users, or if it is determined that the user did not authorize sharing of the user embedding vector generated for the user, a determination is made as to whether one or more non-users have shared an embedding vector representative of that non-user with the user, as in 610. For example, other persons that are non-users with respect to the user may utilize the disclosed implementations and embedding vectors generated as representative of speech of those individuals.

If it is determined that no non-users have shared embedding vectors with the user, the example process 600 completes, as in 612. However, if it is determined that one or more non-users have shared embedding vectors representative of speech of that non-user, the identity of the non-user and the corresponding embedding vector is received and stored in memory of the wearable device or user device of the user, as in 614. A determination may also be made as to whether any unidentified non-user embedding vectors generated from audio data segments of prior interactions with the user match the received and stored non-user embedding vector, as in 616. For example, as discussed above, if a first non-user has previously interacted with the user, an unidentified non-user embedding vector may be generated as representative of speech of that non-user. Subsequently, when the non-user shares an embedding vector generated for the non-user, the example process 600 may determine that the shared embedding vector for the non-user corresponds to the generated unidentified non-user. In one example, a distance between the generated unidentified non-user embedding vectors and the shared non-user embedding vector may be determined and, if the difference is within a defined distance (i.e., the embedding vectors are similar), it may be determined that the two embedding vectors represent the same non-user.

If it is determined that a generated unidentified non-user embedding vector matches a shared non-user embedding vector, the unidentified non-user embedding vector may be determined to correspond to the identity of the non-user that shared the non-user embedding vector, as in 618. If it is determined that the shared non-user embedding vector does not match any generated unidentified non-user embedding vectors, the example process completes, as in 612.

Figure 7:
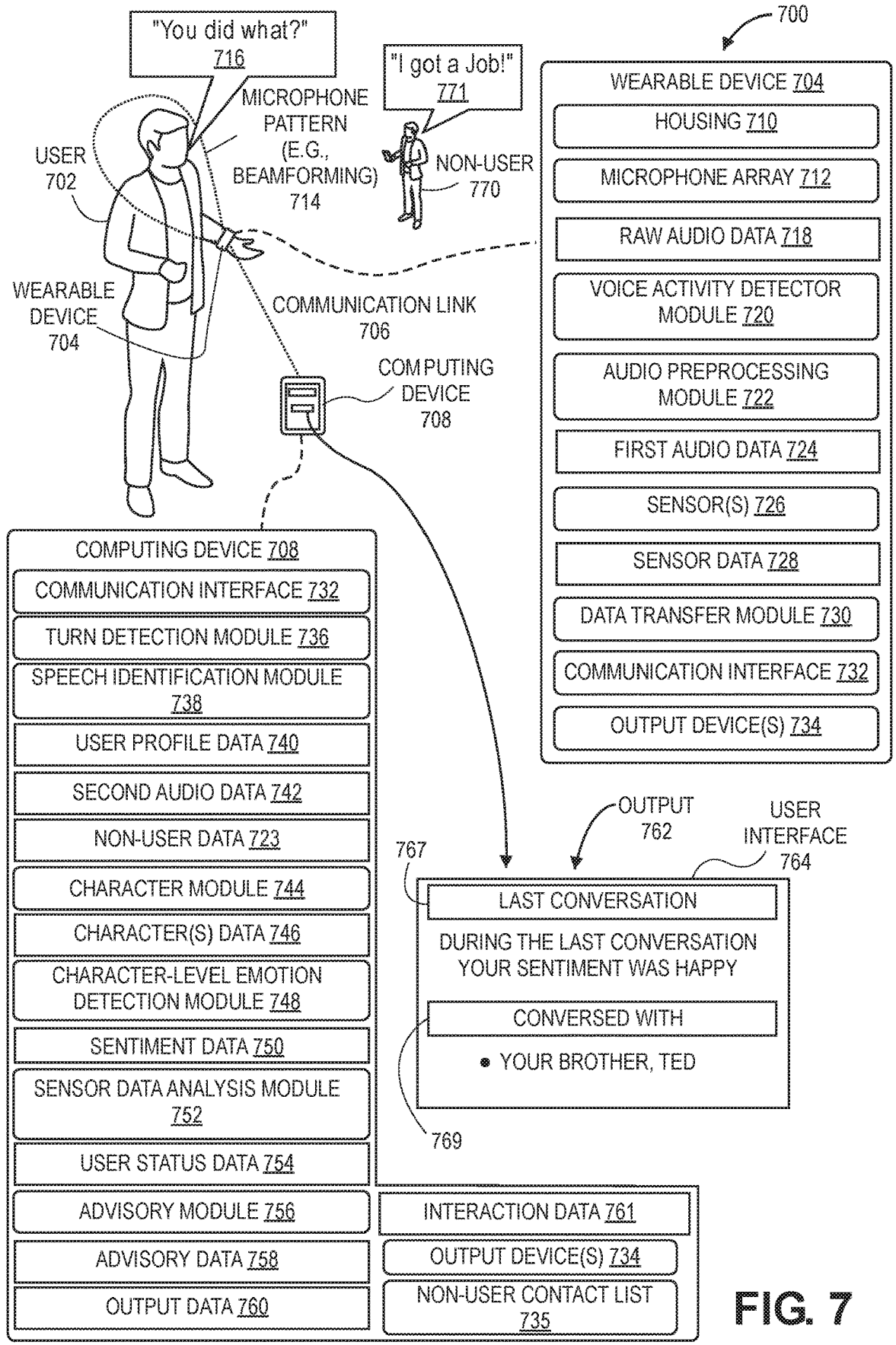
FIG. 7 is an illustrative system that processes speech of a user to determine sentiment data that is indicative of an emotional state as conveyed by the speech and presenting output related to that sentiment data, in accordance with described implementations.

FIG. 7 is an illustrative system 700 that processes speech of a user 702 to determine sentiment data that is indicative of an emotional state as conveyed by the speech, in accordance with disclosed implementations. Likewise, the illustrative system may also determine non-users involved in an interaction and provide information regarding the interaction to the user, including the user's sentiment data for the interaction and/or the identity of non-users involved in the interaction, in accordance with disclosed implementations.

The user 702 may have one or more wearable devices 704 on or about their person. The wearable device 704 may be implemented in various physical form factors including, but not limited to, the following: hats, headbands, necklaces, pendants, brooches, armlets, brassards, bracelets, wristbands, and so forth. In this illustration, the wearable device 704 is depicted as a wristband.

The wearable device 704 may use a communication link 706 to maintain communication with a computing device 708. For example, the computing device 708 may include a phone, tablet computer, personal computer, server, internet enabled device, voice activated device, smart-home device, and so forth. The communication link 706 may implement at least a portion of the Bluetooth Low Energy specification.

The wearable device 704 includes a housing 710. The housing 710 comprises one or more structures that support a microphone array 712. For example, the microphone array 712 may comprise two or more microphones arranged to acquire sound from ports at different locations through the housing 710. As described below, a microphone pattern 714 may provide gain or directivity using a beamforming algorithm. Speech 716 by the user 702, speech 771 by the non-user 770, and/or other sources within range of the microphone array 712 may be detected by the microphone array 712 and raw audio data 718 may be acquired. In other implementations raw audio data 718 may be acquired from other devices.

A voice activity detector module 720 may be used to process the raw audio data 718 and determine if speech 716 is present. For example, the microphone array 712 may obtain raw audio data 718 that contains ambient noises such as traffic, wind, and so forth. Raw audio data 718 that is not deemed to contain speech 716 may be discarded. Resource consumption is minimized by discarding raw audio data 718 that does not contain speech 716. For example, power consumption, demands for memory and computational resources, communication bandwidth, and so forth are minimized by limiting further processing of raw audio data 718 determined to not likely contain speech 716.

The voice activity detector module 720 may use one or more techniques to determine voice activity. For example, characteristics of the signals present in the raw audio data 718, such as frequency, energy, zero-crossing rate, and so forth, may be analyzed with respect to threshold values to determine characteristics that are deemed likely to be human speech.

Once at least a portion of the raw audio data 718 has been determined to contain speech 716, an audio preprocessing module 722 may further process this portion to determine first audio data 724. In some implementations, the audio preprocessing module 722 may apply one or more of a beamforming algorithm, noise reduction algorithms, filters, and so forth to determine the first audio data 724. For example, the audio preprocessing module 722 may use a beamforming algorithm to provide directivity or gain and improve the signal to noise ratio (SNR) of the speech 716 from the user 702 or non-user 770 with respect to speech 716/771 or noise from other sources.

The wearable device 704 may include one or more sensors 726 that generate sensor data 728. For example, the sensors 726 may include accelerometers, pulse oximeters, and so forth. The sensors 726 are discussed in more detail with regard to FIG. 8.

The audio preprocessing module 722 may use information from one or more sensors 726 during operation. For example, sensor data 728 from an accelerometer may be used to determine orientation of the wearable device 704. Based on the orientation, the beamforming algorithm may be operated to provide a microphone pattern 714 that includes a location where the user's 702 head is expected to be.

A data transfer module 730 may use a communication interface 732 to send the first audio data 724, sensor data 728, or other data to the computing device 708 using the communication link 706. For example, the data transfer module 730 may determine that a memory within the wearable device 704 has reached a predetermined quantity of stored first audio data 724. The communication interface 732 may comprise a Bluetooth Low Energy device that is operated responsive to commands from the data transfer module 730 to send the stored first audio data 724 to the computing device 708.

In some implementations, the first audio data 724 may be encrypted prior to transmission over the communication link 706. The encryption may be performed prior to storage in the memory of the wearable device 704, prior to transmission via the communication link 706, or both.

Communication between the wearable device 704 and the computing device 708 may be persistent or intermittent. For example, the wearable device 704 may determine and store first audio data 724 even while the communication link 706 to the computing device 708 is unavailable. At a later time, when the communication link 706 is available, the first audio data 724 may be sent to the computing device 708.

The wearable device 704 may include one or more output devices 734. For example, the output devices 734 may include a light emitting diode, haptic output device, speaker, and so forth. The output devices 734 are described in more detail with regard to FIG. 8.

The computing device 708 may include a communication interface 732. For example, the communication interface 732 of the computing device 708 may comprise a Bluetooth Low Energy device, a Wi-Fi network interface device, and so forth. The computing device 708 receives the first audio data 724 from the wearable device 704 via the communication link 706.

The computing device 708 may use a turn detection module 736 to determine that portions of the first audio data 724 are associated with different speakers (user or non-user (s)). For example, when more than one person is speaking, a "turn" is a contiguous portion of speech by a single person. A first turn may include several sentences spoken by a first person, while a second turn includes a response by the second person. The turn detection module 736 may use one or more characteristics in the first audio data 724 to determine that a turn has taken place. For example, a turn may be detected based on a pause in speech 716, change in pitch, change in signal amplitude, and so forth. For example, if the pause between words exceeds 350 milliseconds, data indicative of a turn may be determined. In other examples, the pause may be greater or less than 350 milliseconds.

In some implementations, the turn detection module 736 may process segments of the first audio data 724 to determine if the person speaking at the beginning of the segment is the same as the person speaking at the end. The first audio data 724 may be divided into segments and subsegments. For example, each segment may be six seconds long with a first subsegment that includes a beginning two seconds of the segment and a second subsegment that includes the last two seconds of the segment. The data in the first subsegment is processed to determine a first set of features and the data in the second subsegment is processed to determine a second set of features. Segments may overlap, such that at least some data is duplicated between successive segments. If the first set of features and the second set of features are determined to be within a threshold value of one another, they may be deemed to have been spoken by the same person. If the first set of features and the second set of features are not within the threshold value of one another, they may be deemed to have been spoken by different people. A segment that includes speech from two different people may be designated as a break between one speaker and another. In this implementation, those breaks between speakers may be used to determine the boundaries of a turn.

For example, a turn may be determined to begin and end when a segment includes speech from two different people.

In some implementations the turn detection module 736 may operate in conjunction with, or as part of, a speech identification module 738, as described below. For example, if the speech identification module 738 identifies that a first segment is spoken by the user and a second segment is spoken by a non-user, data indicative of a turn may be determined.

The speech identification module 738 may access user profile data 740 to determine if the first audio data 724 is associated with the user 702. For example, user profile data 740 may comprise information about speech 716 provided by the user 702 during an enrollment process. During enrollment, the user 702 may provide a sample of their speech 716 which is then processed to determine features that may be used to identify if speech 716 is likely to be from that user 702.

The speech identification module 738 may process at least a portion of the first audio data 724 that is designated as a particular turn to determine if the user 702 is the speaker. For example, the first audio data 724 of the first turn may be processed by the speech identification module 738 to determine a confidence level of 0.97 that the first turn is the user 702 speaking. A threshold confidence value of 0.95 may be specified. Continuing the example, the first audio data 724 of the second turn may be processed by the speech identification module 738 that determines a confidence level of 0.17 that the second turn is the user 702 speaking.

Second audio data 742 is determined that comprises the portion(s) of the first audio data 724 that is determined to be speech 716 from the user 702. For example, the second audio data 742 may consist of the speech 716 which exhibits a confidence level greater than the threshold confidence value of 0.95. As a result, the second audio data 742 omits speech 716 from other sources, such as someone (non-user) who is in conversation with the user 702.

A character module 744 uses the second audio data 742 to determine character data 746 from the second audio data 742. For example, the character module 744 may use one or more systems such as signal analysis, classifiers, neural networks, and so forth to generate the character data 746. The character data 746 may comprise values, vectors, and so forth. For example, the character module 744 may use a convolutional neural network that accepts as input the second audio data 742 and provides as output character data that includes characters corresponding to the second audio data 742.

A character-level emotion detection ("CED") module 748, also referred to herein as a CED network, uses the character data 746 to determine sentiment data 750. Human speech involves a complex interplay of biological systems on the part of the person speaking. The character analysis module 748 determines the sentiment data 750 that is indicative of a possible emotional state of the user 702 based on the character data 746. The character module 748 may determine various values that are deemed to be representative of emotional state.

As discussed herein, use of character data and the described CED network reduces computation requirements and also avoids the need for an analysis of the words spoken and/or their meaning. For example, the described implementations do not need an automated speech recognition (ASR) system to determine the text of the spoken words.

The sentiment data 750 determined by the character module 748 may be expressed as one or more numeric values, vectors, words, and so forth. For example, the sentiment data 750 may comprise a composite single value, such as a numeric value, color, and so forth. For example, a weighted sum of the valence, activation, and dominance values may be used to generate an overall sentiment index or "tone value" or "mood value." In another example, the sentiment data 750 may comprise one or more vectors in an n-dimensional space. In yet another example, the sentiment data 750 may comprise associated words that are determined by particular combinations of other values, such as valence, activation, and dominance values. The sentiment data 750 may comprise values that are non-normative. For example, a sentiment value that is expressed as a negative number may not be representative of an emotion that is considered to be bad.

In addition to determining the sentiment data for the user, the computing device may also process segments determined not to include speech of the user to determine if that speech corresponds to an identified non-user, such as non-user 770. For example, as discussed herein, non-user speech data 723 may be compared with embedding vectors corresponding to a non-user contact list 735 maintained by the computing device and indicative of the speech of non-users with which the user 702 frequently interacts.

The computing device 708 may include a sensor data analysis module 752. The sensor data analysis module 752 may process the sensor data 728 and generate user status data 754. For example, the sensor data 728 obtained from sensors 726 on the wearable device 704 may comprise information about movement obtained from an accelerometer, pulse rates obtained from a pulse oximeter, and so forth. The user status data 754 may comprise information such as total movement by the wearable device 704 during particular time intervals, pulse rates during particular time intervals, and so forth. The user status data 754 may provide information that is representative of the physiological state of the user 702.

In some implementations, interaction data 761 that includes the sentiment data, the non-user identity, sensor data collected during the interaction, etc., may also be maintained by the computing device 708 and used to generate and provide outputs 762 to the user indicating information about one or more interactions.

An advisory module 756 may use the sentiment data 750, interaction data 761, and/or the user status data 754 to determine advisory data 758. The sentiment data 750, the interaction data 761, and the user status data 754 may each include timestamp information. Sentiment data 750 for a first time period may be associated with user status data 754 for a second time period. Historical data may be used to determine trends. These trends may then be used by the advisory module 756 to determine advisory data 758. For example, trend data may indicate that, when the user has meetings (an interaction) late in the afternoon with a particular non-user, the user's overall tone value is below their personal baseline value or that the user's emotional state is generally angry during those meetings. As a result, the advisory module 756 may generate advisory data 758 to inform the user 702 of this and suggest that meetings with that non-user be scheduled at a different time.

In some implementations, the advisory data 758 may include speech recommendations. These speech recommendations may include suggestions as to how the user 702 may manage their speech to change or moderate the apparent emotion presented by their speech. In some implementations, the speech recommendations may advise the user 702 to speak more slowly, pause, breathe more deeply, suggest a different tone of voice, and so forth. For example, if the sentiment data 750 indicates that the user 702 appears to have been upset, the advisory data 758 may be for the user 702 to stop speaking for ten seconds and then continue speaking in a calmer voice.

The computing device 708 may generate output data 760 from one or more of the sentiment data 750, interaction data 761, or the advisory data 758. For example, the output data 760 may comprise hypertext markup language (HTML) instructions that, when processed by a browser engine, generate an image of a graphical user interface (GUI). In another example, the output data 760 may comprise an instruction to play a particular sound, operate a buzzer, or operate a light to present a particular color at a particular intensity.

The output data 760 may then be used to operate one or more output devices 734. Continuing the examples, the GUI may be presented on a display device, a buzzer may be operated, the light may be illuminated, and so forth to provide output 762. The output 762 may include a user interface 764, such as the GUI depicted in FIG. 7 that provides information about the sentiment during an interaction, such as a last conversation 767 between the user 702 and a non-user 770. In this example, the sentiment is presented as an indication of the emotional state of the user during the last conversation (interaction), along with an indication 769 of the non-user that the user interacted with.

In some implementations, the sentiment may be expressed as numeric values and interface elements with particular colors associated with those numeric values which may be presented in the user interface. For example, if the sentiment of the user 702 has one or more values that exceed the user's 702 typical range for a metric associated with being happy, an interface element colored green may be presented. In contrast, if the sentiment of the user 702 has one or more values that are below the user's 702 typical range, an interface element colored blue may be presented. The typical range may be determined using one or more techniques. For example, the typical range may be based on minimum sentiment values, maximum sentiment values, may be specified with respect to an average or linear regression line, and so forth.

It is understood that the various functions, modules, and operations described in this system 700 may be performed by other devices. For example, the advisory module 756 may execute on a server.

Figure 8:
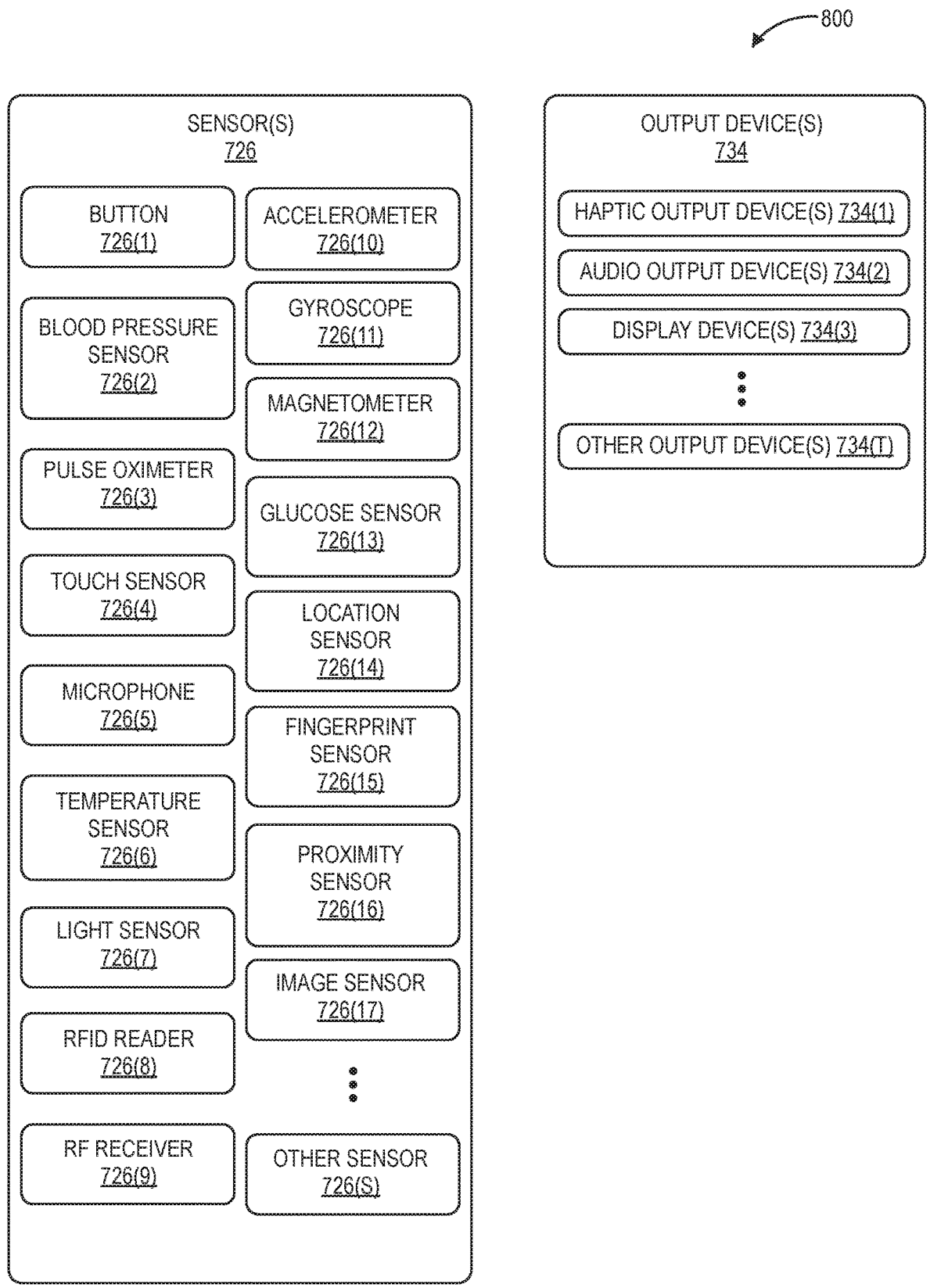
FIG. 8 illustrates a block diagram of sensors and output devices that may be used during operation of the system, in accordance with described implementations.

FIG. 8 illustrates a block diagram 800 of sensors 726 and output devices 734 that may be used by the wearable device 704, the computing device 708, or other devices during operation of the system 700, according to one implementation. As described above with regard to FIG. 7, the sensors 726 may generate sensor data 728.

The one or more sensors 726 may be integrated with or internal to a computing device, such as the wearable device 704, the computing device 708, and so forth. For example, the sensors 726 may be built-in to the wearable device 704 during manufacture. In other implementations, the sensors 726 may be part of another device. For example, the sensors 726 may comprise a device external to, but in communication with, the computing device 708 using Bluetooth, Wi-Fi, 3G, 4G, LTE, ZigBee, Z-Wave, or another wireless or wired communication technology.

The one or more sensors 726 may include one or more buttons 726(1) that are configured to accept input from the user 702. The buttons 726(1) may comprise mechanical, capacitive, optical, or other mechanisms. For example, the buttons 726(1) may comprise mechanical switches configured to accept an applied force from a touch of the user 702 to generate an input signal. In some implementations, input from one or more sensors 726 may be used to initiate acquisition of the raw audio data 718. For example, activation of a button 726(1) may initiate acquisition of the raw audio data 718.

A blood pressure sensor 726(2) may be configured to provide sensor data 728 that is indicative of the user's 702 blood pressure. For example, the blood pressure sensor 726(2) may comprise a camera that acquires images of blood vessels and determines the blood pressure by analyzing the changes in diameter of the blood vessels over time. In another example, the blood pressure sensor 726(2) may comprise a sensor transducer that is in contact with the skin of the user 702 that is proximate to a blood vessel.

A pulse oximeter 726(3) may be configured to provide sensor data 728 that is indicative of a cardiac pulse rate and data indicative of oxygen saturation of the user's 702 blood. For example, the pulse oximeter 726(3) may use one or more light emitting diodes (LEDs) and corresponding detectors to determine changes in apparent color of the blood of the user 702 resulting from oxygen binding with hemoglobin in the blood, providing information about oxygen saturation. Changes over time in apparent reflectance of light emitted by the LEDs may be used to determine cardiac pulse.

The sensors 726 may include one or more touch sensors 726(4). The touch sensors 726(4) may use resistive, capacitive, surface capacitance, projected capacitance, mutual capacitance, optical, Interpolating Force-Sensitive Resistance ("IFSR"), or other mechanisms to determine the position of a touch or near-touch of the user 702. For example, the IFSR may comprise a material configured to change electrical resistance responsive to an applied force. The location within the material of that change in electrical resistance may indicate the position of the touch.

One or more microphones 726(5) may be configured to acquire information about sound present in the environment. In some implementations, a plurality of microphones 726(5) may be used to form the microphone array 712. As described above, the microphone array 712 may implement beamforming techniques to provide for directionality of gain.

A temperature sensor (or thermometer) 726(6) may provide information indicative of a temperature of an object. The temperature sensor 726(6) in the computing device may be configured to measure ambient air temperature proximate to the user 702, the body temperature of the user 702, and so forth. The temperature sensor 726(6) may comprise a silicon bandgap temperature sensor, thermistor, thermocouple, or other device. In some implementations, the temperature sensor 726(6) may comprise an infrared detector configured to determine temperature using thermal radiation.

The sensors 726 may include one or more light sensors 726(7). The light sensors 726(7) may be configured to provide information associated with ambient lighting conditions such as a level of illumination. The light sensors 726(7) may be sensitive to wavelengths including, but not limited to, infrared, visible, or ultraviolet light. In contrast to a camera, the light sensor 726(7) may typically provide a sequence of amplitude (magnitude) samples and color data while the camera provides a sequence of two-dimensional frames of samples (pixels).

One or more radio frequency identification (RFID) readers 726(8), near field communication (NFC) systems, and so forth, may also be included as sensors 726. The user 702, objects around the computing device, locations within a building, and so forth, may be equipped with one or more radio frequency (RF) tags. The RF tags are configured to emit an RF signal. In one implementation, the RF tag may be a RFID tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy ("BLE") transmitter and battery. In other implementations, the tag may use other techniques to indicate its presence. For example, an acoustic tag may be configured to generate an ultrasonic signal, which is detected by corresponding acoustic receivers. In yet another-implementation, the tag may be configured to emit an optical signal.

One or more RF receivers 726(9) may also be included as sensors 726. In some implementations, the RF receivers 726(9) may be part of transceiver assemblies. The RF receivers 726(9) may be configured to acquire RF signals associated with Wi-Fi, Bluetooth, ZigBee, Z-Wave, 3G, 4G, LTE, or other wireless data transmission technologies. The RF receivers 726(9) may provide information associated with data transmitted via radio frequencies, signal strength of RF signals, and so forth. For example, information from the RF receivers 726(9) may be used to facilitate determination of a location of the computing device, and so forth.

The sensors 726 may include one or more accelerometers 726(10). The accelerometers 726(10) may provide information such as the direction and magnitude of an imposed acceleration, tilt relative to local vertical, and so forth. Data such as rate of acceleration, determination of changes in direction, speed, tilt, and so forth, may be determined using the accelerometers 726(10).

A gyroscope 726(11) provides information indicative of rotation of an object affixed thereto. For example, the gyroscope 726(11) may indicate whether the device has been rotated.

A magnetometer 726(12) may be used to determine an orientation by measuring ambient magnetic fields, such as the terrestrial magnetic field. For example, output from the magnetometer 726(12) may be used to determine whether the device containing the sensor 726, such as the computing device 708, has changed orientation or otherwise moved. In other implementations, the magnetometer 726(12) may be configured to detect magnetic fields generated by another device.

A glucose sensor 726(13) may be used to determine a concentration of glucose within the blood or tissues of the user 702. For example, the glucose sensor 726(13) may comprise a near infrared spectroscope that determines a concentration of glucose or glucose metabolites in tissues. In another example, the glucose sensor 726(13) may comprise a chemical detector that measures presence of glucose or glucose metabolites at the surface of the user's skin.

A location sensor 726(14) is configured to provide information indicative of a location. The location may be relative or absolute. For example, a relative location may indicate "kitchen," "bedroom," "conference room," and so forth. In comparison, an absolute location is expressed relative to a reference point or datum, such as a street address, geolocation comprising coordinates indicative of latitude and longitude, grid square, and so forth. The location sensor 726 (14) may include, but is not limited to, radio navigation-based systems such as terrestrial or satellite-based navigational systems. The satellite-based navigation system may include one or more of a Global Positioning System ("GPS") receiver, a Global Navigation Satellite System ("GLONASS") receiver, a Galileo receiver, a BeiDou Navigation Satellite System ("BDS") receiver, an Indian Regional Navigational Satellite System, and so forth. In some implementations, the location sensor 726(14) may be omitted or operate in conjunction with an external resource such as a cellular network operator providing location information, or Bluetooth beacons.

A fingerprint sensor 726(15) is configured to acquire fingerprint data. The fingerprint sensor 726(15) may use an optical, ultrasonic, capacitive, resistive, or other detector to obtain an image or other representation of features of a fingerprint. For example, the fingerprint sensor 726(15) may comprise a capacitive sensor configured to generate an image of the fingerprint of the user 702.

A proximity sensor 726(16) may be configured to provide sensor data 728 indicative of one or more of a presence or absence of an object, a distance to the object, or characteristics of the object. The proximity sensor 726(16) may use optical, electrical, ultrasonic, electromagnetic, or other techniques to determine a presence of an object. For example, the proximity sensor 726(16) may comprise a capacitive proximity sensor configured to provide an electrical field and determine a change in electrical capacitance due to presence or absence of an object within the electrical field.

An image sensor 726(17) comprises an imaging element to acquire images in visible light, infrared, ultraviolet, and so forth. For example, the image sensor 726(17) may comprise a complementary metal oxide (CMOS) imaging element or a charge coupled device (CCD).

The sensors 726 may include other sensors 726(S) as well. For example, the other sensors 726(S) may include strain gauges, anti-tamper indicators, and so forth. For example, strain gauges or strain sensors may be embedded within the wearable device 704 and may be configured to provide information indicating that at least a portion of the wearable device 704 has been stretched or displaced such that the wearable device 704 may have been donned or doffed.

In some implementations, the sensors 726 may include hardware processors, memory, and other elements configured to perform various functions. Furthermore, the sensors 726 may be configured to communicate by way of a network or may couple directly with the other devices.

The computing device may include or may couple to one or more output devices 734. The output devices 734 are configured to generate signals which may be perceived by the user 702, detectable by the sensors 726, or a combination thereof.

Haptic output devices 734(1) are configured to provide a signal, which results in a tactile sensation to the user 702. The haptic output devices 734(1) may use one or more mechanisms such as electrical stimulation or mechanical displacement to provide the signal. For example, the haptic output devices 734(1) may be configured to generate a modulated electrical signal, which produces an apparent tactile sensation in one or more fingers of the user 702. In another example, the haptic output devices 734(1) may comprise piezoelectric or rotary motor devices configured to provide a vibration that may be felt by the user 702.

One or more audio output devices 734(2) are configured to provide acoustic output. The acoustic output includes one or more of infrasonic sound, audible sound, or ultrasonic sound. The audio output devices 734(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output by an audio output device 734(2).

The display devices 734(3) may be configured to provide output that may be seen by the user 702 or detected by a light-sensitive detector such as the image sensor 726(17) or light sensor 726(7). The output may be monochrome or color. The display devices 734(3) may be emissive, reflective, or both. An emissive display device 734(3), such as using LEDs, is configured to emit light during operation. In comparison, a reflective display device 734(3), such as using an electrophoretic element, relies on ambient light to present an image. Backlights or front lights may be used to illuminate non-emissive display devices 734(3) to provide visibility of the output in conditions where the ambient light levels are low.

The display mechanisms of display devices 734(3) may include, but are not limited to, micro-electromechanical systems ("MEMS"), spatial light modulators, electroluminescent displays, quantum dot displays, liquid crystal on silicon ("LCOS") displays, cholesteric displays, interferometric displays, liquid crystal displays, electrophoretic displays, LED displays, and so forth. These display mechanisms are configured to emit light, modulate incident light emitted from another source, or both. The display devices 734(3) may operate as panels, projectors, and so forth.

The display devices 734(3) may be configured to present images. For example, the display devices 734(3) may comprise a pixel-addressable display. The image may comprise at least a two-dimensional array of pixels or a vector representation of at least two-dimensional image.

In some implementations, the display devices 734(3) may be configured to provide non-image data, such as text or numeric characters, colors, and so forth. For example, a segmented electrophoretic display device 734(3), segmented LED, and so forth, may be used to present information such as letters or numbers. The display devices 734(3) may also be configurable to vary the color of the segment, such as using multicolor LED segments.

Other output devices 734(T) may also be present. For example, the other output devices 734(T) may include scent dispensers.

Figure 9:
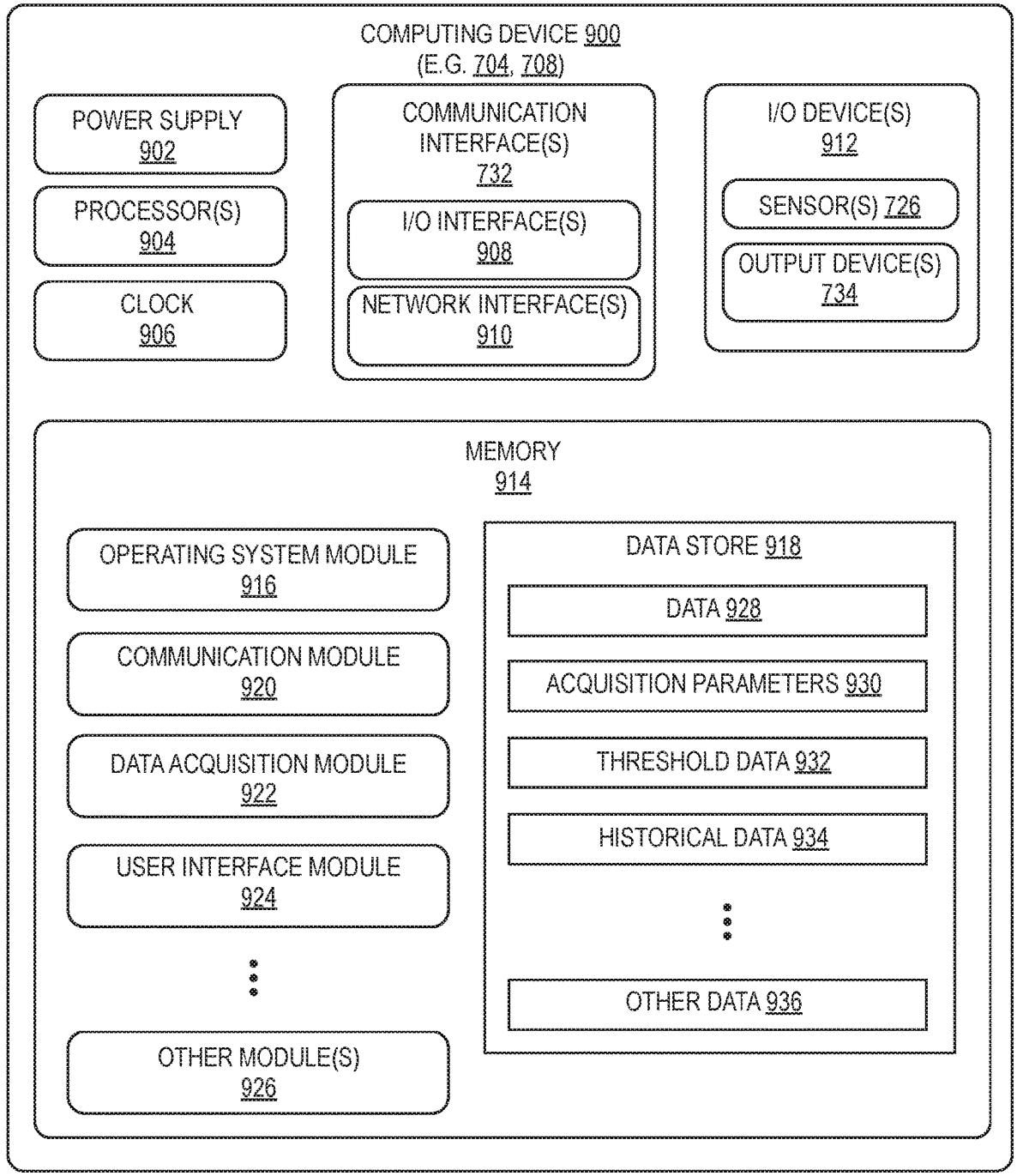
FIG. 9 illustrates a block diagram of a computing device (s) such as a wearable device, smartphone, or other devices, in accordance with described implementations.

FIG. 9 illustrates a block diagram of a computing device 900 configured to support operation of the system 700. As described above, the computing device 900 may be the wearable device 704, the computing device 708, and so forth.

One or more power supplies 902 are configured to provide electrical power suitable for operating the components in the computing device 900. In some implementations, the power supply 902 may comprise a rechargeable battery, fuel cell, photovoltaic cell, power conditioning circuitry, wireless power receiver, and so forth.

The computing device 900 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to generate a timestamp, trigger a preprogrammed action, and so forth.

The computing device 900 may include one or more communication interfaces 732 such as input/output (I/O) interfaces 908, network interfaces 910, and so forth. The communication interfaces 732 enable the computing device 900, or components thereof, to communicate with other devices or components. The communication interfaces 732 may include one or more I/O interfaces 908. The I/O interfaces 908 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 908 may couple to one or more I/O devices 912. The I/O devices 912 may include input devices such as one or more of the sensors 726. The I/O devices 912 may also include output devices 734 such as one or more of an audio output device 734(2), a display device 734(3), and so forth. In some embodiments, the I/O devices 912 may be physically incorporated with the computing device 900 or may be externally placed.

The network interfaces 910 are configured to provide communications between the computing device 900 and other devices, such as the sensors 726, routers, access devices, and so forth. The network interfaces 910 may include devices configured to couple to wired or wireless personal area networks ("PANs"), local area networks ("LANs"), wide area networks ("WANs"), and so forth. For example, the network interfaces 910 may include devices compatible with Ethernet, Wi-Fi, Bluetooth, ZigBee, 4G, 5G, LTE, and so forth.

The computing device 900 may also include one or more busses or other internal communications hardware or software that allow for the transfer of data between the various modules and components of the computing device 900.

As shown in FIG. 9, the computing device 900 includes one or more memories 914. The memory 914 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 914 provides storage of computer-readable instructions, data structures, program modules, and other data for the operation of the computing device 900. A few example functional modules are shown stored in the memory 914, although the same functionality may alternatively be implemented in hardware, firmware, or as a system on a chip (SOC).

The memory 914 may include at least one operating system (OS) module 916. The OS module 916 is configured to manage hardware resource devices such as the I/O interfaces 908, the network interfaces 910, the I/O devices 912, and provide various services to applications or modules executing on the processors 904. The OS module 916 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; the Android operating system from Google Corporation of Mountain View, Calif., USA; the iOS operating system from Apple Corporation of Cupertino, Calif., USA; or other operating systems.

Also stored in the memory 914 may be a data store 918 and one or more of the following modules. These modules may be executed as foreground applications, background tasks, daemons, and so forth. The data store 918 may use a flat file, database, linked list, tree, executable code, script, or other data structure to store information. In some implementations, the data store 918 or a portion of the data store 918 may be distributed across one or more other devices including the computing devices 900, network attached storage devices, and so forth.

A communication module 920 may be configured to establish communications with one or more of other computing devices 900, the sensors 726, and so forth. The communications may be authenticated, encrypted, and so forth. The communication module 920 may also control the communication interfaces 732.

The memory 914 may also store a data acquisition module 922. The data acquisition module 922 is configured to acquire raw audio data 718, sensor data 728, and so forth. In some implementations the data acquisition module 922 may be configured to operate the one or more sensors 726, the microphone array 712, and so forth. For example, the data acquisition module 922 may determine that the sensor data 728 satisfies a trigger event. The trigger event may comprise values of sensor data 728 for one or more sensors 726 exceeding a threshold value. For example, if pulse oximeter 726(3) on the wearable device 704 indicates that the pulse of the user 702 has exceeded a threshold value, the microphone array 712 may be operated to generate raw audio data 718.

In another example, the data acquisition module 922 on the wearable device 704 may receive instructions from the computing device 708 to obtain raw audio data 718 at a specified interval, at a scheduled time, and so forth. For example, the computing device 708 may send instructions to acquire raw audio data 718 for 60 seconds every 540 seconds. The raw audio data 718 may then be processed with the voice activity detector module 720 to determine if speech 716 is present. If speech 716 is detected, the first audio data 724 may be obtained and then sent to the computing device 708.

A user interface module 924 provides a user interface using one or more of the I/O devices 912. The user interface module 924 may be used to obtain input from the user 702, present information to the user 702, and so forth. For example, the user interface module 924 may present a graphical user interface on the display device 734(3) and accept user input using the touch sensor 726(4).

One or more other modules 926, such as the voice activity detector module 720, the audio preprocessing module 722, the data transfer module 730, the turn detection module 736, the speech identification module 738, the character module 744, the character-level emotion detection module 748, the sensor data analysis module 752, the advisory module 756, and so forth may also be stored in the memory 914.

Data 928 may be stored in the data store 918. For example, the data 928 may comprise one or more of raw audio data 718, first audio data 724, sensor data 728, user profile data 740, second audio data 742, sentiment data 750, user status data 754, advisory data 758, output data 760, and so forth.

One or more acquisition parameters 930 may be stored in the memory 914. The acquisition parameters 930 may comprise parameters such as audio sample rate, audio sample frequency, audio frame size, and so forth.

Threshold data 932 may be stored in the memory 914. For example, the threshold data 932 may specify one or more thresholds used by the voice activity detector module 720 to determine if the raw audio data 718 includes speech 716.

The computing device 900 may maintain historical data 934. The historical data 934 may be used to provide information about trends or changes over time. For example, the historical data 934 may comprise an indication of sentiment data 750 on an hourly basis for the previous 90 days. In another example, the historical data 934 may comprise user status data 754 for the previous 90 days.

Other data 936 may also be stored in the data store 918.

In different implementations, different computing devices 900 may have different capabilities or capacities. For example, the computing device 708 may have significantly more processor 904 capability and memory 914 capacity compared to the wearable device 704. In one implementation, the wearable device 704 may determine the first audio data 724 and send the first audio data 724 to the computing device 708. In another implementation, the wearable device 704 may generate the sentiment data 750, advisory data 758, and so forth. Other combinations of distribution of data processing and functionality may be used in other implementations.

FIG. 10 illustrates a block diagram of the conversion of speech 1000 to sentiment data 1008, in accordance with described implementations.

Traditional systems utilize automatic speech recognition ("ASR") engines to process speech of a user and determine the words spoken by the user. Decoding words by ASR is computationally expensive, especially because a high-quality decoder usually needs a large language model and lexicon and a complex decoding algorithm. Additionally, the words decoded by ASR are not directly used by humans. Instead, words get converted to feature vectors using a large embedding matrix.

As illustrated in FIG. 10, rather than using a complex ASR, the disclosed implementations avoid decoding words and instead use a greedy decoder, such as TensorFlow, to decode the audio to a sequence of spaces and characters. As discussed further below, speech 1000 from a user is processed by a greedy decoder to convert the speech into a sequence of spaces and characters 1002. For example, if the speech 1000 includes the statement "hello world," the decoder converts the speech into the sequence "H E L O * W O R L D", with * representing a space, as illustrated in block 1004. A CED network 1006 then processes the characters 1004 to determine sentiment data 1008 representative of the emotion of the user that generated the speech 1000.

Figure 11A:
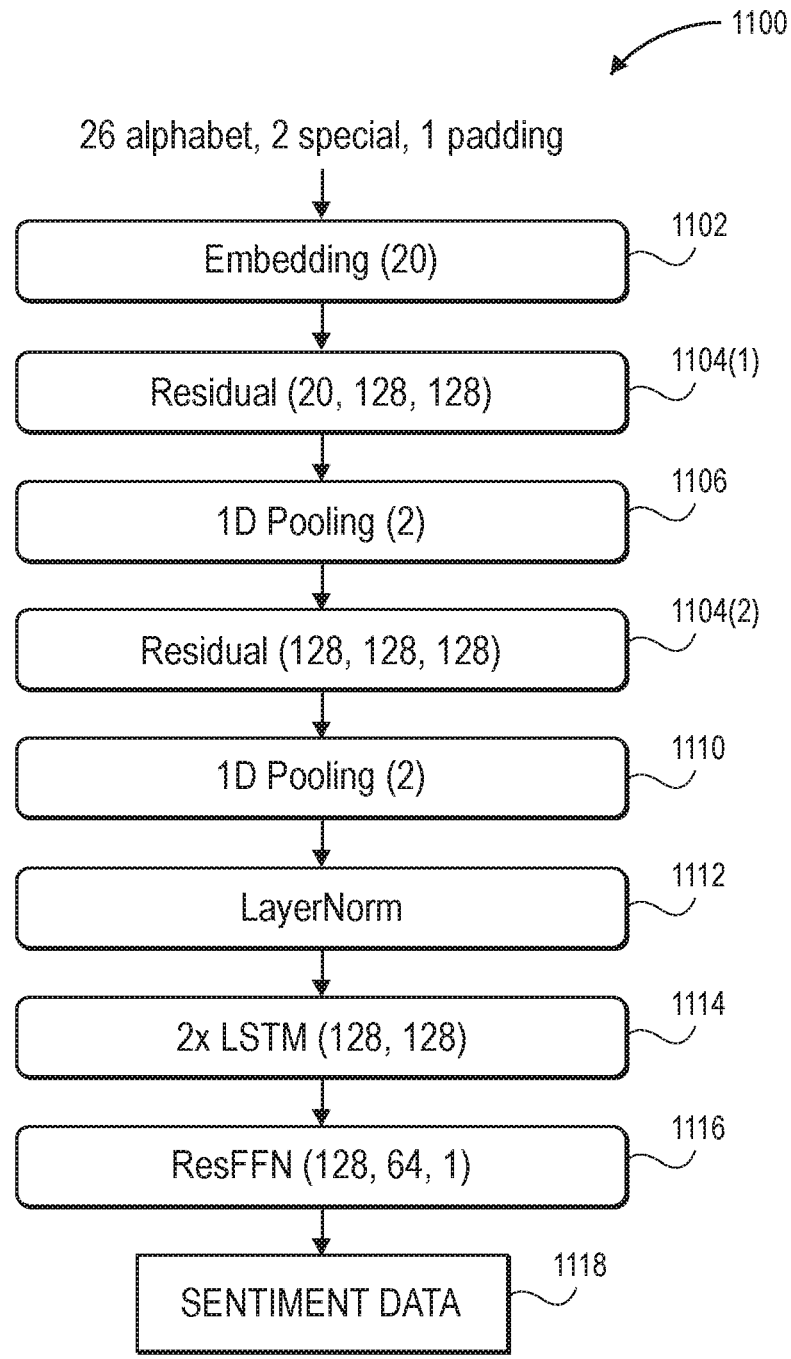
FIG. 11A illustrates a block diagram of a character-level emotion detection network used to convert an input into sentiment data, in accordance with described implementations.

FIG. 11A illustrates a block diagram of a CED network 1100 used to convert an input of character data into sentiment data, in accordance with described implementations. The CED network may be any type of neural network, such as a convolutional neural network, deep learning network, etc.

As illustrated in FIG. 11A, the CED network 1100 includes embedding layer 1102, followed by two residual blocks 1104(1), 1104(2), a normalization layer 1112, two layers of Long Short-Term Memory ("LSTM") 1114, and a residual fully connected layer 1116. In addition, there are pooling layers 1106 and 1110 following the residual layers 1104(1), 1104(2) to reduce the length of the input sequence and the amount of computations. In total, the input sequence length is reduced by a factor of four before the resulting sequence is fed to the LSTM layer 1114. The normalization layer 1112, which is optional in various implementations, improves the speed of the CED network 1100.

As illustrated in FIG. 11A, in some implementations, the CED network 1100 may be trained to receive an input sequence of character data that includes a twenty-nine dimensional probability vector—twenty-six alphabet characters, two special characters (space and apostrophe), and a padding character. The embedding layer 1102 receives the twenty-nine dimensional probability vector and embeds the vector into a twenty-dimensional space. As is known in the art of neural networks, embedding is a method used to represent discrete variables, such as characters, as vectors of continuous numbers. In this example, the character sequence of input data is converted into an embedding in a twenty-dimensional space.

The embedding is then processed by the first residual layer 1104(1) that processes the received embedding as a twenty-dimensional input using a 128-dimensional hidden space that generates a 128-dimensional feature map as the output from the residual layer. The 128-dimensional feature map was selected as the learning capacity of the network to enable the network to operate in environments with limited computing capacity, such as on a wearable device and/or a portable device of a user. In other implementations, the hidden space may be of a different size, such as 256, etc. Processing of the residual layers 1104(1), 1104(2) is discussed further below with respect to FIG. 11B.

The output, or residual (also known as a feature map), from the first residual layer 1104(1) is processed by the first pooling layer 1106. The first pooling layer 1106, which may be a one-dimensional pooling ("1D pooling"), down samples the residual input received at the pooling layer 1106 by summing features of the residual input to reduce the overall length of the input by a factor of two. In the disclosed implementation, with a 128-dimensional feature map as the input, the output from the pooling 1106 will be a 128-dimensional pooled feature map with the length halved.

The pooled feature map output from the first pooling layer 1106, is provided as an input to the second residual layer 1104(2). The second residual layer 1104(2) processes the received input, which in this example is a 128-dimensional input using a 128-dimensional hidden space and produces a second 128-dimensional feature map. As noted above, processing of the residual layers is discussed further below with respect to FIG. 11B.

The output of the second residual layer 1104(2), in this example, the second 128-dimensional feature map, is again down sampled through a second 1D pooling layer 1110. Similar to the first pooling layer 1106, the second pooling layer, in this example, down samples the residual input received by the pooling layer 1110 by summing features of the residual input to again reduce the length of the input by a factor of two. In the disclosed implementation, with a 128-dimensional feature map as the input, the output from the second pooling 1110 will be a 128-dimensional pooled feature map. Through both one-dimensional poolings, the overall length of the input to the network 1100 is reduced by a factor of four.

The pooled feature map output from the second pooling layer 1110 is processed by a normalization layer 1112. The normalization layer 1112 removes any outlier data in the pooled feature map. In some implementations, the normalization layer may determine the average mean and remove any data of the pooling layer that is beyond one standard deviation from the average mean. In other implementations, the normalization layer may remove data of the pooling layer that is beyond two standard deviations from the average mean. The output from the normalization layer is a normalized pooled feature map.

The normalized pooled feature map output from the normalization layer 1112 is provided as an input to the long short-term memory ("LSTM") layer 1114. The LSTM layer 1114 is a sequential model that goes over the sequence of the received input and outputs a representation of the sequence. In this example, the LSTM includes two layers that process the output of the normalization layer 1112. Upon completion of processing, the LSTM outputs a representation of the sequence as a fixed size 128-dimensional output.

The output of the LSTM layer 1114 is provided as input to a residually connected feed forward network ("ResFFN") 1116. The ResFFN 1116 receives as an input from the LSTM layer a 128-dimensional sequence, has a hidden layer size of 64, and an output size of 1. The ResFFN 1116 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations. For example, the range may be any value between negative-five and positive five, with negative values representing more negative sentiment and positive values representing more positive sentiment. In other implementations, the range may be narrower or wider, all negative, all positive, etc. For example, in other examples, the range may include values between zero and five, with zero representing negative sentiment and five representing positive sentiment.

Figure 11B:
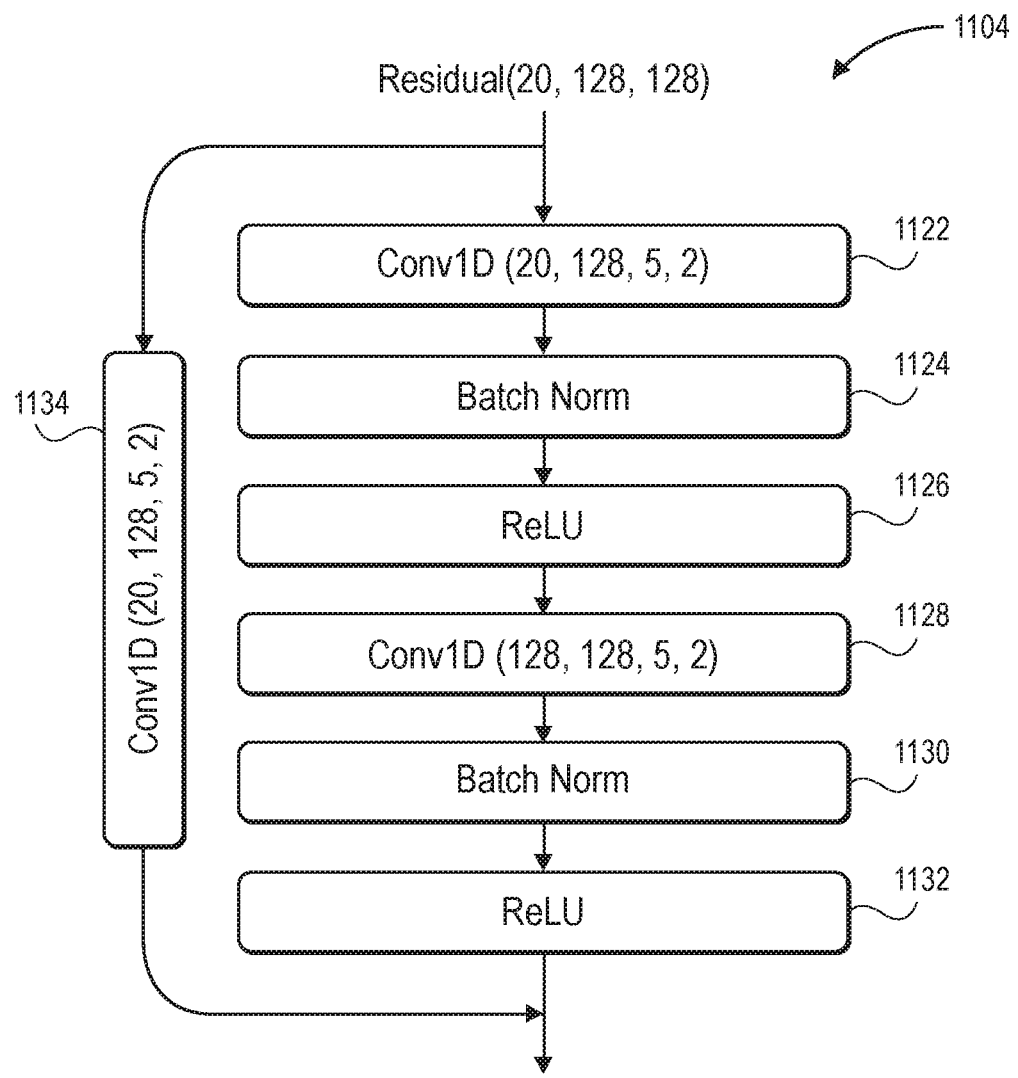
FIG. 11B illustrates a block diagram of residual layers of the character-level emotion detection network of FIG. 11A, in accordance with described implementations.

FIG. 11B illustrates a block diagram of the residual layers 1104(1), 1104(2) of FIG. 11A, in accordance with described implementations. As is known, the residual layers typically include one or more convolutions, such as convolutions 1122, 1128, each of which are followed by normalization layers 1124 and 1130 and activation layers, generally referred to as Rectified Linear Units ("ReLU") layers 1126, 1132. In the illustrated example, the convolution layers 1122, 1128 each apply filters having a kernel size of five and a padding of two. In other implementations, the convolution layers may utilize different kernel sizes and/or paddings and those illustrated here are provided only as examples.

Finally, as is known, the residual layer 1104 may also include a skip connection 1134 that is a convolution included in the residual 1104 to ensure that the processing does not get stuck in the nonlinearity of the ReLU layers.

Figure 12A:
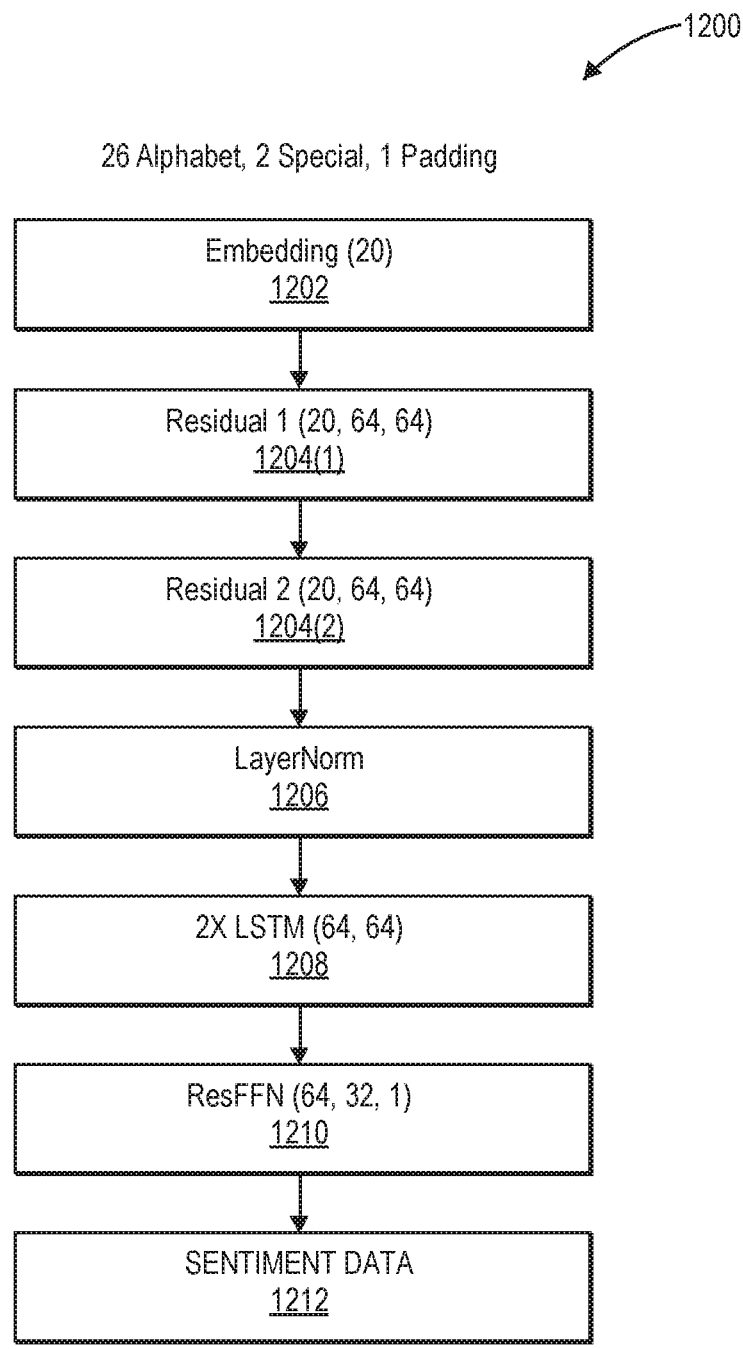
FIG. 12A illustrates a block diagram of another character-level emotion detection network used to convert an input into sentiment data, in accordance with described implementations.

FIG. 12A illustrates a block diagram of another CED network 1200 used to convert an input of character data into sentiment data, in accordance with described implementations. In comparison to the CED 1100 illustrated in FIG. 11A, the CED 1200 includes pooling layers within the residual layers, as discussed further below with respect to FIGS. 12B and 12C. The CED 1200 is also more compact with only 124 dimensions.

As illustrated in FIG. 12A, the CED network 1200 includes an embedding layer 1202 followed by two residual blocks 1204(1), 1204(2), a normalization layer 1206, two layers of Long Short-Term Memory ("LSTM") 1208, and an ResFFN 1210. In the example illustrated in FIGS. 12A through 12C, the input sequence length is reduced by a factor of eight, due to the pooling layers included in the residual layers, as discussed further below, before the resulting sequence is fed to the LSTM layer 1208. The normalization layer 1206, which is optional in various implementations, improves the speed of the CED network 1200.

As illustrated in FIG. 12A, in some implementations, the CED network 1200 may be trained to receive an input sequence of character data that includes a twenty-nine dimensional input—twenty-six alphabet characters, two special characters, and a padding character. The embedding layer 1202 receives the twenty-nine dimensional input and embeds the input into a twenty-dimensional space.

The embedding is then processed by the first residual layer 1204(1) that processes the received embedding as a twenty-dimensional input using a 64-dimensional hidden space that generates a 64-dimensional feature map as the output from the residual layer. Processing of the residual layer 1204(1) is discussed further below with respect to FIG. 12B.

The output, or residual (also known as a feature map), from the first residual layer 1204(1) is provided as an input to the second residual layer 1204(2), which again processes the input and generates a 64-dimensional feature map as the output from the second residual layer 1204(2). As discussed further below with respect to FIGS. 12B and 12C, the first residual layer 1204(1) includes two pooling layers that shorten the length of the data in total by a factor of four and the second residual layer 1204(2) includes a third pooling layer that again shortens the length of the data such that the length of the output from the second residual layer 1204(2) has been shorted by a factor of eight compared to the original input to the CED.

The output of the second residual layer 1204(2), in this example, the second 64-dimensional feature map, is processed by a normalization layer 1206. The normalization layer 1206 removes any outlier data in the feature map. In some implementations, the normalization layer may determine the average mean and remove any data of the feature map that is beyond one standard deviation from the average mean. In other implementations, the normalization layer may remove data of the feature map that is beyond two standard deviations from the average mean. The output from the normalization layer is a normalized pooled feature map.

The normalized pooled feature map output from the normalization layer 1206 is provided as an input to the long short-term memory ("LSTM") layer 1208. The LSTM layer 1208 is a sequential model that goes over the sequence of the received input and outputs a representation of the sequence. In this example, the LSTM includes two layers that process the output of the normalization layer 1206. Upon completion of processing, the LSTM outputs a representation of the sequence as a fixed size 64-dimensional output.

The output of the LSTM layer 1208 is provided as input to a ResFFN 1210. The ResFFN 1210 receives as an input from the LSTM layer a 64-dimensional sequence, has a hidden layer size of 32, and an output size of 1. The ResFFN 1210 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations.

Figure 12B:
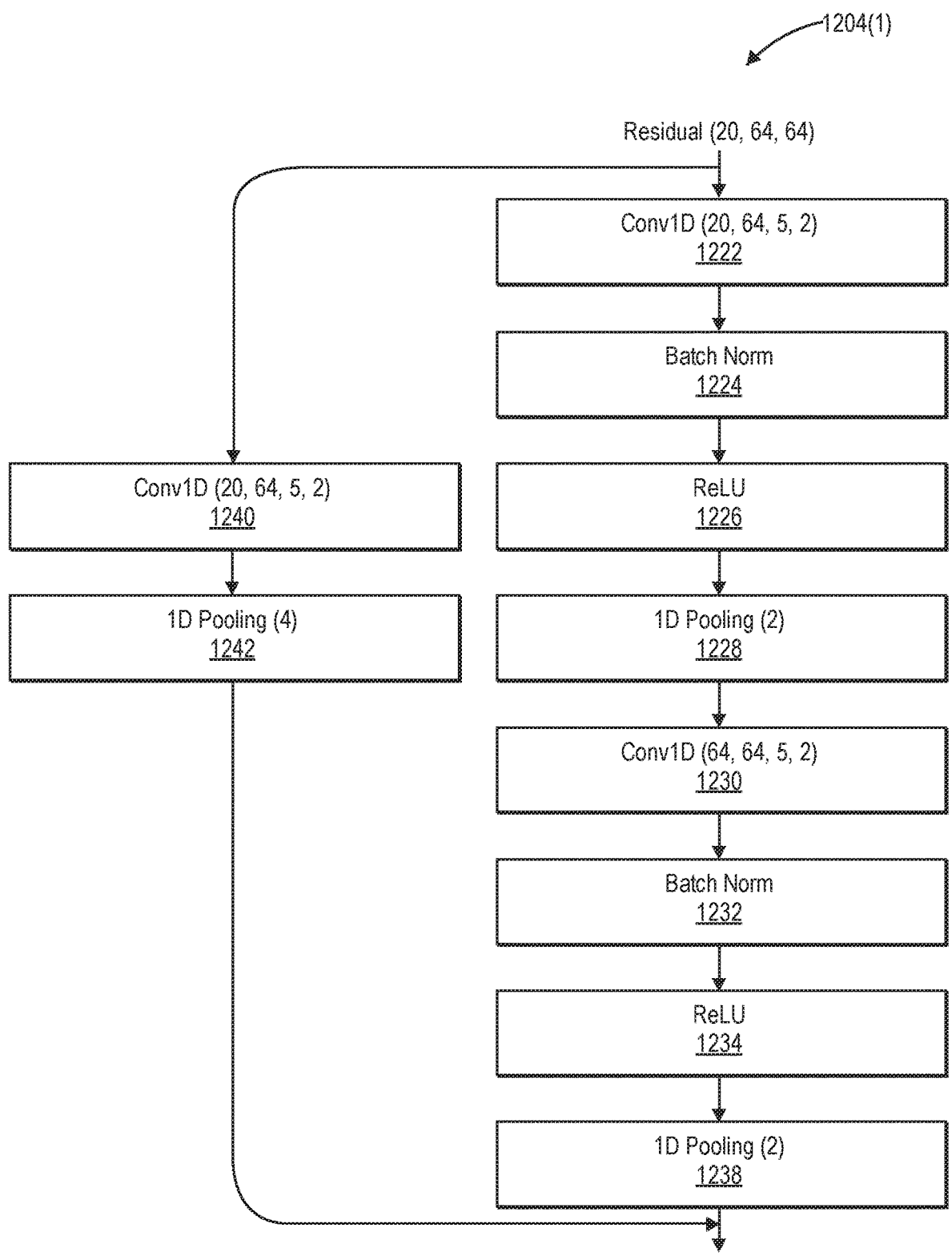
FIGS. 12B and 12C illustrate block diagrams of residual layers of the character-level emotion detection network of FIG. 12A, in accordance with described implementations.
Figure 12C:
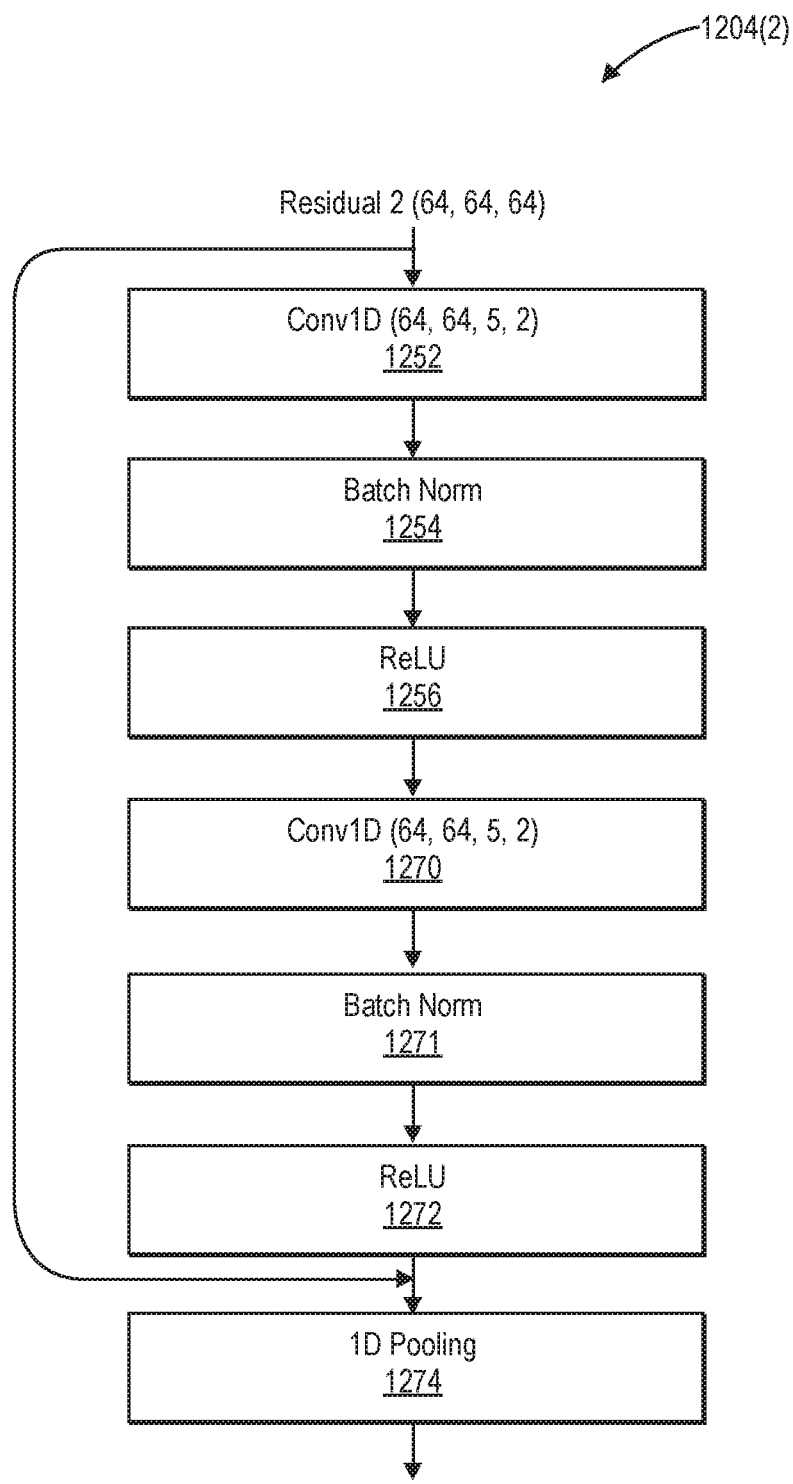

FIGS. 12B and 12C illustrate block diagrams of the first residual 1204(1) and the second residual layer 1204(2) of the character-level emotion detection network 1200 of FIG. 12A, respectively, in accordance with described implementations.

Referring first to FIG. 12B, the first residual layer 1204(1) includes one or more convolutions, such as convolutions 1222, 1230, each of which are followed by normalization layers 1224 and 1232 and ReLU layers 1226, 1234. In this example, the residual 1204(1) also includes a first 1D pooling layer 1228 that receives as input the output of the first ReLU 1226. Similar to the 1D pooling discussed above, the pooling layer 1228 down samples the input received at the pooling layer 1228 by summing features of the input to reduce the overall length of the input by a factor of two. In the disclosed implementation, with a 64-dimensional feature map as the input, the output from pooling 1228 will be a 64-dimensional pooled feature map with the length halved compared to the input. Likewise, the second pooling layer 1238 receives as input the output from the second ReLU 1234 and processes that input to again reduce the overall length of the input by a factor of two. With both pooling layers in the residual 1204(1), the output of the first residual layer has been reduced in length by a factor of four.

Finally, as is known, the residual layer 1204(1) may also include a skip connection 1240/1242 that is a convolution and pooling included in the residual 1204(1) to ensure that the processing does not get stuck in the nonlinearity of the ReLU layers.

Referring now to FIG. 12C, illustrated is a block diagram 1204(2) of the second residual layer 1204(2) of FIG. 12A, in accordance with disclosed implementations.

Similar to the above, in this example, the second residual 1204(2) includes two convolutions 1252, 1270, each of which are followed by normalization layers 1254 and 1271 and ReLU layers 1256, 1272. In the illustrated example, the convolution layers 1222, 1230, 1252, 1270 of FIGS. 12B and 12C, like the other convolution layers discussed herein, each apply filters having a kernel size of five and a padding of two. In other implementations, the convolution layers may utilize different kernel sizes and/or paddings and those illustrated here are provided only as examples.

Finally, in this example, the output of the second ReLU 1272 is provided to pooling layer 1274 that processes the data and shortens the length of the input to the pooling layer 1274 by a factor of two. As a result, the input to the CED 1200 (FIG. 12A) is shortened in length by a factor of eight.

As will be appreciated, the above examples of CED configurations illustrated in FIGS. 11A, 11B, 12A, 12B, and 12C are provided as examples. In other implementations, the CED configurations may be different with a different number of pooling layers and/or a different configuration.

As is known, character-based natural language processing ("NPL") models have recently become popular, especially in the analysis of documents with frequent misspellings. These models are vocabulary-free and able to cope with frequent misspellings in domains such as social media and electronic health records. Character-based NPL models also do not require a large word embedding matrix, resulting in smaller overall model size. Statistically, character-based NPL can generalize better on small datasets because they do not need to disambiguate a large set of words.

In the disclosed implementations, the CED network 1100/1200 can efficiently process the decoded sequence of characters and extract the emotion content, and a training algorithm based on transfer learning and data augmentation to efficiently train the CED network 1100/1200. As discussed above, the CED network 1100/1200 is configured to shorten the input sequence using several pooling operations. Shortening the input sequence reduces the computational cost of the CED network 1100/1200.

To train the CED network 1100/1200, sentiment detection using a labeled data set of characters may be utilized. The CED network 1100/1200 may then be fine-tuned on a transcribed emotion-annotated audio sample. In addition, in some implementations, training and resulting robustness of the CED network 1100/1200 may be further improved by augmenting character data provided to the CED by randomly changing some of the characters in the input character data.

Figure 13:
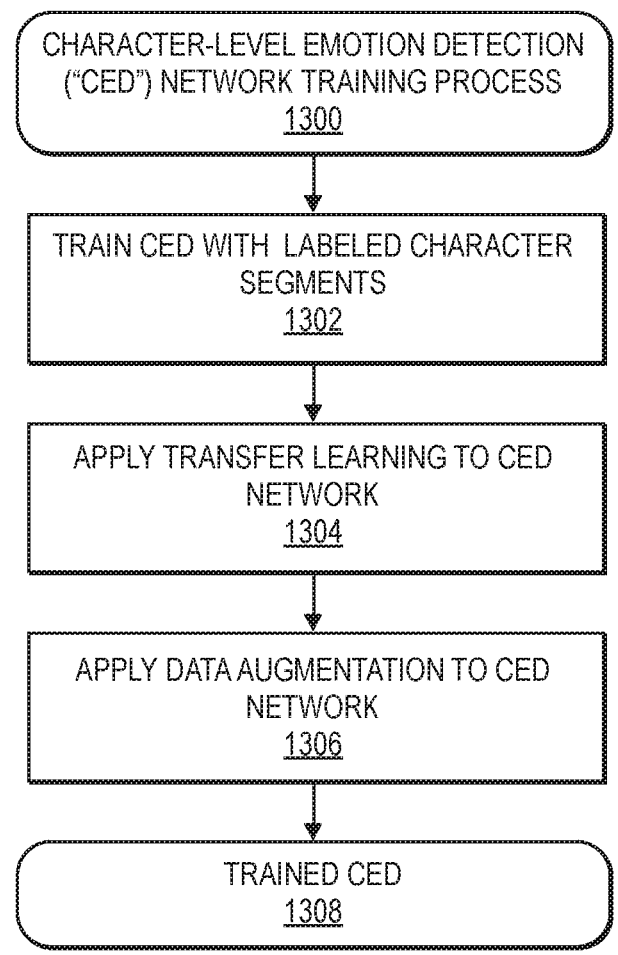
FIG. 13 is an example flow diagram of a character-level emotion detection network training process, in accordance with described implementations.

FIG. 13 is an example flow diagram of a CED network training process 1300, in accordance with described implementations. To begin training of a CED network, such as the CED network 1100/1200 illustrated in FIGS. 11A, 12A, the CED network is first trained with labeled character segments, as in 1302. For example, one or more public data sets of character based content that includes some form of labels relating to a potential emotion or sentiment of the content may be used. Example public data sets may include, but are not limited to, data sets of public reviews of products that also include some form of rating (e.g., star rating), the Interactive Emotional Dyadic Motion Capture ("IEMO-CAP") data set, etc. Training with these data sets is used to predict sentiment scores based on the input character sequences and corresponding labels relating to the character sequences.

In addition to training the CED network with one or more data sets of labeled character segments, in some implementations, transfer learning may also be applied to further refine and train the CED network, as in 1304. For example, transfer learning may be used to correlate the similarities between the sentiment scores and emotion detection tasks In addition to transfer learning, in some implementations, data augmentation may be introduced to randomly replace characters of the character sequences input into the CED network to further increase the robustness of the CED network, as in 1306. An example of data augmentation is discussed in further detail below with respect to FIG. 14.

With the above process 1300, the CED network is trained, as in 1308. Training may be done prior to deployment of the CED network as well as periodically or on-going during use of the neural network.

Figure 14:
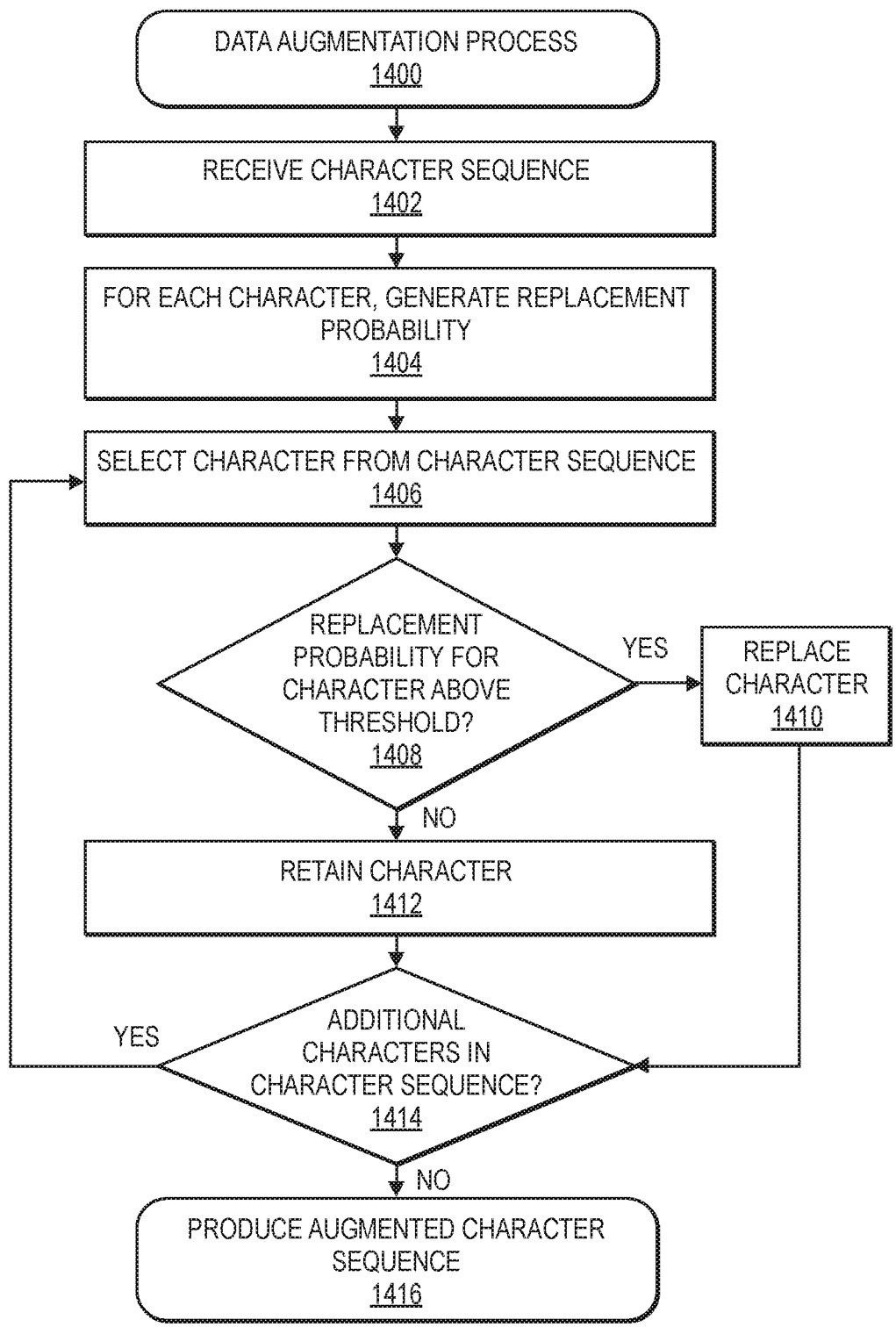
FIG. 14 is an example flow diagram of a data augmentation process, in accordance with described implementations.

FIG. 14 is an example flow diagram of a data augmentation process 1400, in accordance with described implementations. In the example illustrated in FIG. 14, the process 1400 begins upon receipt of a character sequence, also referred to herein as character data, as in 1402. For each character in the character sequence a replacement probability is randomly generated and assigned to the character of the character sequence, as in 1404. The replacement probability may be a score or other value indicative of a probability that the character will be replaced.

Upon determining a replacement probability for each character, a character of the character sequence is selected, as in 1406. For the selected character, a determination is made as to whether the replacement probability for the character is above a threshold, as in 1408. The threshold may be any value or amount.

If it is determined that the replacement probability for the character is above a threshold, the character is replaced with another character, as in 1410. The replacement character may be randomly selected from any of the 26 alphabetic characters or the two special characters. If it is determined that the replacement probability is not above the threshold, the character is retained, as in 1412.

After either replacing or retaining the character, a determination is made as to whether additional characters in the character sequence remain that are to be processed by the example process 1400, as in 1414. In some implementations, all characters of a character sequence may be processed by the example process 1400. In other implementations, only a percentage of the characters of a character sequence may be processed by the example process 1400. For example, in some implementations, only fifty-percent of the characters may be processed.

If it is determined that additional characters are to be processed, the example process 1400 returns to block 1406 and continues. If it is determined that no additional characters are to be processed, an augmented character sequence is produced that includes the retained characters and the replaced characters, as in 1416.

Figure 15:
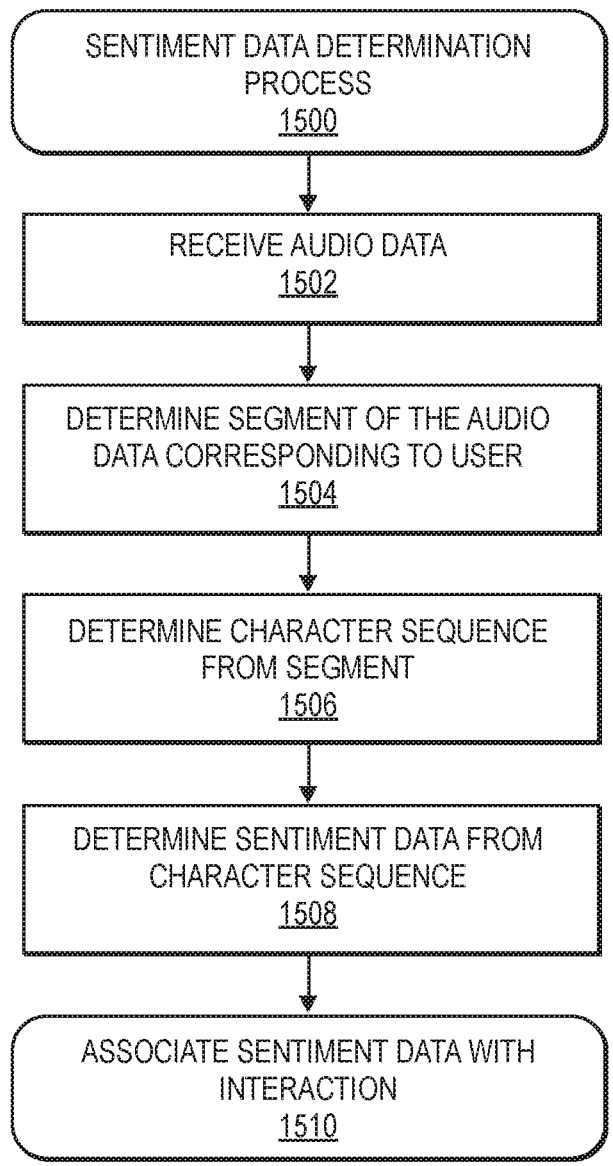
FIG. 15 is an example flow diagram of a sentiment data determination process, in accordance with described implementations.

FIG. 15 is an example flow diagram of a sentiment data determination process 1500, in accordance with described implementations.

The example process 1500 begins upon receipt of audio data, also referred to herein as speech data, as in 1502. For example, as discussed above, a wearable and/or client device of a user may include one or more microphones that receive raw audio within the environment and the received audio generated as audio data. A determination may then be made to determine a segment of the audio data that corresponds to the user, as in 1504. For example, and as discussed above, the audio data may be initially processed to remove non-speech audio data (e.g., wind, noises, etc.) and/or to segment out speech generated by other individuals that are not the user (i.e., are non-users).

The segment of audio data is then processed to generate a character sequence of characters, also referred to herein as character data, determined from the segment of audio data, as in 1506. For example, a greedy algorithm may be used to process the audio data to generate a character sequence without having to use an ASR algorithm to determine the words included in the audio data, thereby reducing the computational cost of processing the audio data.

The CED network discussed above may then process the character sequence to determine sentiment data, as in 1508. As discussed, the determined sentiment data is representative of the emotional state of the user when generating the speech that is recorded in the audio data.

Finally, the sentiment data may be associated with the interaction for which the audio data was received, as in 1510.

As discussed above, sentiment data for a user may be generated for each interaction that user has with other non-users. Likewise, non-users may be identified, as discussed above, and associated with those interactions. In some implementations, the user may view sentiment data with respect to a user, time of day, day of week, location, etc.

Figure 16:
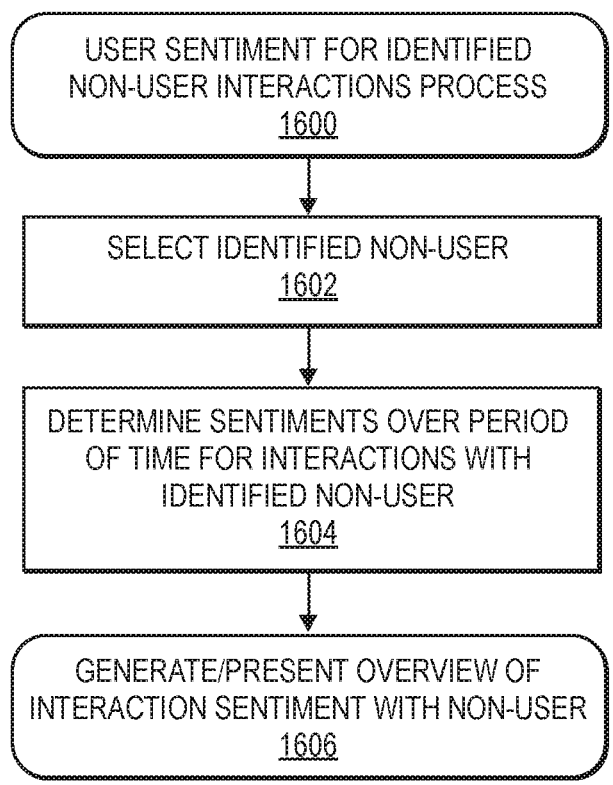
FIG. 16 is an example flow diagram of a user sentiment for identified non-user interactions process, in accordance with described implementations.

For example, FIG. 16 is an example flow diagram of a user sentiment for identified non-user interactions process 1600, in accordance with described implementations.

The example process 1600 begins upon selection by the user of an identified non-user, as in 1602. For example, the user may select an identified non-user from the user's contact list or select any other identified non-user (e.g., a non-user with which they just interacted).

Upon selection of a non-user, the example process 1600 determines user sentiment data for different interactions the user has had with that non-user during a defined period of time, as in 1604. The period of time may be a set period of time (e.g., weeks, months, years) or may be a defined period of time selected or otherwise specified by the user.

Finally, an overview and/or details about the determined user sentiment may be generated and presented to the user to illustrate to the user the sentiment of the user during interactions with the selected non-user, as in 1606.

While the example process discussed with respect to FIG. 16 is in response to a selection by the user of a non-user for which collected user sentiment is to be presented, in other implementations, sentiment data for interactions with a non-user may be presented to the user at other times. For example, when a particular sentiment (e.g., angry, frustrated, happy, sad) is determined for a user during an interaction with a non-user, overview and/or details about the sentiment, the interaction, and/or other interactions between the user and the non-user may be proactively generated and presented to the user. As still another example, if sentiment data for the user that is non-typical for that user is determined, information about the determined sentiment and the interaction that resulted in the sentiment may be generated and presented to the user. Various other examples may be realized with the disclosed implementations to determine the generation and providing of sentiment data to a user.

Likewise, presentation of sentiment data, information about interactions, etc., may be presented visually, audibly, and/or through haptics to the user via, for example, a user device associated with the user (e.g., tablet, laptop, phone, etc.), through a wearable associated with the user (e.g., watch, ring, wristband, necklace, etc.), through a smart device associated with the user, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:
one or more processors; and
a memory storing program instructions that when executed by the one or more processors cause the one or more processors to at least:
receive a first audio data that includes a first speech generated by a user during an interaction with a first non-user;
receive a second audio data that includes a second speech generated by the first non-user during the interaction;
process the first audio data, without determining words included in the first speech, to determine character data that includes a sequence of characters representative of the first speech;
process, with a neural network, the character data to produce a sentiment data representative of a determined emotional state of the user during the interaction;
process the second audio data, without determining words included in the second audio data, to generate an embedding vector representative of the second audio data;
compare the embedding vector with a plurality of stored embedding vectors generated from audio data from a plurality of non-users during prior interactions with the user;
determine a match between the embedding vector and a first stored embedding vector of the plurality of stored embedding vectors, the match indicating that the embedding vector and the first stored embedding vector are both representative of speech generated by the first non-user during interactions with the user;
determine that an interaction count associated with the first stored embedding exceeds a threshold;
in response to a determination that the interaction count exceeds the threshold, determine an identity of the first non-user; and
present to the user the identity of the first non-user and at least the sentiment data of the user determined for the interaction with the first non-user.

2. The computing system of claim 1, wherein the program instructions that when executed by the one or more processors to determine the identity of the first non-user, further include program instructions that, when executed by the one or more processors, cause the one or more processors to at least:
determine a plurality of potential identities of the first non-user;
present at least one of the plurality of potential identities of the first non-user to the user for confirmation as the identity of the first non-user; and
receive, from the user, an indication of the at least one of the plurality of potential identities as the identity of the first non-user.

3. The computing system of claim 2, wherein the program instructions that, when executed by the one or more processors, further include program instructions that, when executed by the one or more processors, further cause the one or more processors to at least:
present an indication of at least the interaction and at least one prior interaction between the user and the first non-user.

4. The computing system of claim 1, wherein the program instructions that, when executed by the one or more processors, further include program instructions that, when executed by the one or more processors, further cause the one or more processors to at least:
update, based at least in part on the embedding vector, the first stored embedding.

5. The computing system of claim 1, wherein the program instructions that, when executed by the one or more processors, further include program instructions that, when executed by the one or more processors, further cause the one or more processors to at least:
add the first non-user to a contact list associated with the user, the contact list indicating a plurality of identified non-users with which the user interacts.

6. A computer-implemented method, comprising:
receiving, with an application executing on a user device of a user, a first audio data that includes a first speech of the user during an interaction with a non-user, wherein an identity of the non-user is unknown to the application;
receiving, with the application executing on the user device, second audio data that includes a second speech of the non-user during the interaction;
determining, with the application executing on the user device, based at least in part on the first audio data, a sentiment data representative of a determined emotional state of the user during the interaction;
determining, with the application executing on the user device, based at least in part on the second audio data, that the user has participated in a plurality of prior interactions with the non-user;
determining, with the application executing on the user device, that an interaction count representative of a quantity of the interaction and the plurality of prior interactions exceeds a threshold;
in response to determining that the interaction count exceeds the threshold, determining, with the application executing on the user device, an identity of the non-user; and
presenting, with the user device, the identity of the non-user and at least the sentiment data representative of the determined emotional state of the user during the interaction and second sentiment data representative of a second emotional state of the user during a prior interaction between the user and the non-user.

7. The computer-implemented method of claim 6, further comprising:
generating an association between one or more of the interaction, the user, the identity of the non-user, or the sentiment data; and
storing, in a data store, the association.

8. The computer-implemented method of claim 6, wherein determining that the user has participated in the plurality of prior interactions with the non-user, further includes:
generating a voice embedding vector representative of at least a portion of the second audio data;
comparing the voice embedding vector with a stored embedding vector to determine that the second speech corresponds to the stored embedding vector, wherein the stored embedding vector is representative of prior audio data that includes a third speech of the non-user during a prior interaction with the user; and
in response to determining that the second speech corresponds to the stored embedding vector, increasing the interaction count associated with the stored embedding vector.

9. The computer-implemented method of claim 6, wherein determining the identity of the user, further includes:
presenting, with the user device, a request that the user provide the identity of the non-user.

10. The computer-implemented method of claim 6, wherein determining the identity of the user, further includes:
determining, with the application executing on the user device and based at least in part on supplemental information accessible to the application, a plurality of potential identities of the non-user;
presenting, with the user device, an indication of at least one of the plurality of potential identities; and
presenting, with the user device, a request that the user provide the identity of the non-user.

11. The computer-implemented method of claim 6, wherein the first audio data and the second audio data are not transmitted from the user device.

12. The computer-implemented method of claim 6, further comprising:
storing, in a memory of the user device, an embedding vector representative of the second audio data and indicative of the second speech of the non-user;
subsequent to storing the embedding vector:
receiving, with the application executing on the user device, third audio data that includes a third speech of the user during a second interaction with a second non-user;
receiving, with the application executing on the user device, fourth audio data that includes a fourth speech of the second non-user during the second interaction;
determining, with the application executing on the user device, based at least in part on the third audio data, a second sentiment data representative of a determined third emotional state of the user during the second interaction;
comparing, with the application executing on the user device, the fourth audio data with the stored embedding vector to determine that the fourth audio data corresponds to the embedding vector;
determining, with the application executing on the user device and based at least in part on the comparison, that the second non-user is the non-user; and
associating, with the application executing on the user device, the non-user with the second interaction.

13. The computer-implemented method of claim 6, further comprising:
adding the non-user to a contact list, the contact list indicating a plurality of identified non-users with which the user interacts.

14. The computer-implemented method of claim 6, further comprising:
receiving, with the application executing on the user device, an authorization from the user to share a stored user embedding vector with a second application executing on a second user device, the stored user embedding vector representative of speech produced by the user.

15. The computer-implemented method of claim 6, further comprising:
receiving, with the application executing on the user device, a shared second non-user embedding vector representative of speech produced by a second non-user, wherein the second non-user authorized sharing of the shared second non-user embedding vector with the user.

16. A computer-implemented method, comprising:
processing a first audio data that includes a first speech of a user during an interaction with a non-user;
processing a second audio data that includes a second speech of the non-user during the interaction;
determining, based at least in part on the first audio data, a sentiment data representative of a determined emotional state of the user during the interaction;
determining, based at least in part on the second audio data, that an interaction count representative of a number of interactions between the user and the non-user exceeds a threshold;

in response to determining that the interaction count exceeds the threshold, requesting an identification of the non-user;

receiving the identification of the non-user; and storing an association between the identity of the non-user, the second audio data, the sentiment data of the user, and the interaction, in a user profile.

17. The method of claim 16, further comprising:

determining a plurality of sentiment data of the user corresponding to a plurality of interactions between the user and the non-user;

generating an overview of the plurality of sentiment data of the user and the plurality of interactions between the user and the non-user; and presenting the overview to the user.

18. The method of claim 16, further comprising:

determining, prior to requesting the identity, that the identity of the non-user is unknown.

19. The method of claim 16, further comprising:

generating a voice embedding vector representative of at least a portion of the second audio data;

comparing the voice embedding vector with a plurality of stored embedding vectors representative of speech of a plurality of non-users with which the user has previously interacted; and determining, based at least in part on the comparing, a stored embedding vector corresponding to the non-user as having a highest similarity score with the voice embedding vector.

20. The method of claim 19, further comprising:

in response to determining the stored embedding vector, increasing the interaction count associated with the stored embedding vector.

* * * * *